United States Patent
Sasase

(10) Patent No.: US 9,648,180 B2
(45) Date of Patent: May 9, 2017

(54) INFORMATION PROCESSING SYSTEM PERFORMING OPERATION BASED ON TAG INFORMATION, INFORMATION PROCESSING DEVICE, PORTABLE TERMINAL AND NON-TRANSITORY COMPUTER READABLE RECORDING MEDIUM

(71) Applicant: Konica Minolta, Inc., Chiyoda-ku, Tokyo (JP)

(72) Inventor: Naoko Sasase, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/825,472

(22) Filed: Aug. 13, 2015

(65) Prior Publication Data
US 2016/0057298 A1     Feb. 25, 2016

(30) Foreign Application Priority Data
Aug. 21, 2014   (JP) ................. 2014-168140

(51) Int. Cl.
*H04N 1/00*      (2006.01)

(52) U.S. Cl.
CPC ..... *H04N 1/00392* (2013.01); *H04N 1/00307* (2013.01); *H04N 1/00403* (2013.01);
(Continued)

(58) Field of Classification Search
None
See application file for complete search history.

(56) References Cited

U.S. PATENT DOCUMENTS

| 8,179,544 B2* | 5/2012 | Tsuboi | G06F 3/1206 358/1.13 |
| 9,013,728 B2* | 4/2015 | Adachi | G06F 3/1211 358/1.13 |

(Continued)

FOREIGN PATENT DOCUMENTS

| JP | 2006-135877 A | 5/2006 |
| JP | 2013-214806 A | 10/2013 |

(Continued)

OTHER PUBLICATIONS

Office Action issued on Nov. 1, 2016, by the Japanese Patent Office in corresponding Japanese Patent Application No. 2014-168140 and English translation of the Office Action. (13 pages).

*Primary Examiner* — Paul F Payer
(74) *Attorney, Agent, or Firm* — Buchanan Ingersoll & Rooney PC

(57) ABSTRACT

An information processing system comprising an information processing device and a portable terminal. The information processing device includes: a first wireless communication part that establishes wireless communication with the portable terminal; a screen controller that updates a screen displayed on a display part based on a user operation; a tag information storage that stores therein tag information which is sent to the portable terminal; and a tag information updating part that updates the tag information depending on the screen displayed on the display part. The portable terminal includes: a second wireless communication part that establishes wireless communication with the information processing device; and a controller that performs an operation depending on the screen displayed at the information processing device based on the tag information.

48 Claims, 18 Drawing Sheets

(52) U.S. Cl.
CPC ... *H04N 1/00408* (2013.01); *H04N 2201/006* (2013.01); *H04N 2201/0015* (2013.01); *H04N 2201/0039* (2013.01); *H04N 2201/0075* (2013.01); *H04N 2201/0094* (2013.01)

(56) References Cited

U.S. PATENT DOCUMENTS

| | | | | |
|---|---|---|---|---|
| 9,041,965 | B2* | 5/2015 | Asai | H04N 1/00222 |
| | | | | 358/1.15 |
| 9,277,066 | B2* | 3/2016 | Naruse | H04N 1/00217 |
| 2006/0098224 | A1 | 5/2006 | Tsuboi et al. | |
| 2013/0212261 | A1* | 8/2013 | Fujii | H04N 1/00204 |
| | | | | 709/224 |
| 2013/0258381 | A1 | 10/2013 | Sato | |
| 2014/0085654 | A1 | 3/2014 | Miyazaki | |
| 2014/0168687 | A1* | 6/2014 | Kim | H04N 1/00342 |
| | | | | 358/1.14 |
| 2014/0355057 | A1* | 12/2014 | Jang | G06K 7/10297 |
| | | | | 358/1.15 |
| 2015/0007109 | A1* | 1/2015 | Yun | H04N 1/00307 |
| | | | | 715/810 |
| 2015/0288835 | A1* | 10/2015 | Fein | G06F 3/1204 |
| | | | | 358/1.15 |

FOREIGN PATENT DOCUMENTS

| | | |
|---|---|---|
| JP | 2014-11495 A | 1/2014 |
| JP | 2014-71488 A | 4/2014 |

* cited by examiner

INFORMATION PROCESSING SYSTEM 1

FIG. 3

TAG INFORMATION 14

| | | |
|---|---|---|
| D1 | IP ADDRESS | 192.168.10.4 |
| | MAC ADDRESS | AA:BB:CC:DD:EE:FF |
| | DNS HOST NAME | KMBT011234 |
| | WIRELESS LAN ACCESS POINT | 192.168.10.25 |
| | WIRELESS LAN PASSWORD | **************** |
| | WIRELESS LAN AUTHENTICATION METHOD | WPA |
| D2 | STARTUP APPLICATION | AUTHENTICATION APPLICATION |
| D3 | ACTION | 1: OBTAIN AUTHENTICATION INFORMATION<br>2: SEND AUTHENTICATION INFORMATION |

FIG. 4

REGISTRATION INFORMATION 29

| SCREEN | STARTUP APPLICATION | ACTION |
|---|---|---|
| LOGIN SCREEN | AUTHENTICATION APPLICATION | 1: OBTAIN AUTHENTICATION INFORMATION<br>2: SEND AUTHENTICATION INFORMATION |
| FILE SELECTING SCREEN | BOX APPLICATION | 1: SEND FILE REQUEST<br>2: STORE FILE |
| ADDRESS ENTRY SCREEN | ADDRESS BOOK APPLICATION | 1: DISPLAY ADDRESS LIST<br>2: SEND ADDRESS INFORMATION |
| SCAN SCREEN | SCAN APPLICATION | 1: APPLY SCAN SETTINGS<br>2: SEND SCAN REQUEST<br>3: STORE SCAN DATA |
| TEXT ENTRY SCREEN | VOICE INPUT APPLICATION | 1: RECEIVE VOICE INPUT<br>2: CONVERT INTO TEXT<br>3: SEND TEXT INFORMATION |
| SCAN SCREEN<br>↓<br>OCR SCREEN | SCAN APPLICATION | 1: APPLY SCAN SETTINGS<br>2: SEND SCAN REQUEST<br>3: STORE SCAN DATA<br>4: RUN OCR APPLICATION<br>5: PROCESS OCR<br>6: STORE OCR PROCESSED DATA |

G10

ENTER USER NAME AND PASSWORD AND LOGIN.

USER NAME

PASSWORD

G11

LOGIN USER : USER A

READY TO COPY    NO. OF SETS: 1

| COLOR | 1-SIDED | FINISHING | PAPER |

DOCUMENT

G15

PLEASE ENTER AN ADDRESS TO SEND SCAN DATA.

TO [                    65    ] (REFER)

(OK)  (CANCEL)

G16

PLEASE ENTER AN ADDRESS TO SEND SCAN DATA.

TO [ userX@******.com   65 ] (REFER)

(OK)  (CANCEL)

FIG. 16

TAG INFORMATION 14

| | | |
|---|---|---|
| D1 | IP ADDRESS | 192.168.10.4 |
| | MAC ADDRESS | AA:BB:CC:DD:EE:FF |
| | DNS HOST NAME | KMBT011234 |
| | WIRELESS LAN ACCESS POINT | 192.168.10.25 |
| | WIRELESS LAN PASSWORD | *************** |
| | WIRELESS LAN AUTHENTICATION METHOD | WPA |
| D2 | STARTUP APPLICATION | SCAN APPLICATION |
| D3 | ACTION | 1: APPLY SCAN SETTINGS<br>　　　SETTINGS INFORMATION:....<br>2: SEND SCAN REQUEST<br>3: STORE SCAN DATA<br>4: RUN OCR APPLICATION<br>5: PROCESS OCR<br>6: STORE OCR PROCESSED DATA |

INFORMATION PROCESSING SYSTEM PERFORMING OPERATION BASED ON TAG INFORMATION, INFORMATION PROCESSING DEVICE, PORTABLE TERMINAL AND NON-TRANSITORY COMPUTER READABLE RECORDING MEDIUM

This application is based on the application No. 2014-168140 filed in Japan, the contents of which are hereby incorporated by reference.

BACKGROUND OF THE INVENTION

Field of the Invention

The present invention relates to an information processing system, an information processing device, a portable terminal and a non-transitory computer readable recording medium. The present invention more specifically relates to a technique of causing the information processing device and the portable terminal to work in concert with each other.

Description of the Background Art

Conventional portable terminals perform operations registered in advance based on information read from external mediums such as non-contact IC cards or RFID tags. This known technique is introduced for example in Japanese Patent Application Laid-Open No. JP 2014-11495 A. According to this known technique, it is determined whether or not the portable terminal meets predetermined activating conditions when the information is read from the external medium. The portable terminal performs the operations registered in advance in association with the read information if the predetermined activating conditions are met.

Conventional systems that cause applications run at user terminals to work together and process image data generated at an image processing device on the applications are introduced. This known technique is introduced for example in Japanese Patent Application Laid-Open No. JP 2006-135877 A. According to this known technique, the image processing device obtains information relating to the application run at the user terminal, and creates a one-touch key to process the image data on the application, thereby displaying the created one-touch key. When the user presses the one-touch key, the image processing device sends the image data to the user terminal. As a result, the image processing device is capable of causing the application run at the user terminal to perform the process on the image data.

Recently, according to standards for NFC (near field communication), a technique of describing in advance information relating to an application on tag information has been available to the public. By using this technique, when the portable terminal which has not run the application reads the tag information with NFC, it is allowed to identify the application which should be run based on the information described on the tag information. Hence, the portable terminal is allowed to automatically run the identified application.

It is assumed that the portable terminal automatically runs the application based on the tag information, and causes the running application to perform the operations desired by the user. Even in this case, it is required for the user to operate from the initial screen one by one, which is bothersome for the user. For causing an information processing device such as one of MFPs (Multifunction Peripherals) and the portable terminal to work in concert with each other, the information processing device sends the tag information to the portable terminal, thereby automatically runs the application. Especially in such a case, it is required for the user to configure the settings necessary for the cooperative operations through an operational panel of the information processing device, and operate from the initial screen one by one as required for the cooperative operations to give instructions to the application run at the portable terminal. The user is required to make some bothersome operations to have the information processing device and the portable terminal work in concert with each other with the conventional techniques, resulting in poor operability.

If the portable terminal is one of small devices such as smartphones, its screen is small compared to the operational panel of the information processing device. The user might be necessary to operate the portable terminal running the application repeatedly in order to have the information processing device and the portable terminal work in concert with each other. In this case, it is subject to an erroneous operation, and the user is not allowed to start the cooperative operations efficiently. For having the cooperative operations between the information processing device and the portable terminal, it is anticipated to improve the operability by requiring less operations for the user with the portable terminal, and start the cooperative operations efficiently. This cannot be realized even with a combination of the disclosed conventional techniques as described above.

SUMMARY OF THE INVENTION

The present invention is intended to solve the above problems. Thus, the present invention is intended to provide an information processing system, an information processing device, a portable terminal and a non-transitory computer readable recording medium capable of improving an operability for having a cooperative operation between the information processing device and the portable terminal, and realizing the cooperative operation between the information processing device and the portable terminal efficiently.

First, the present invention is directed to an information processing system comprises an information processing device and a portable terminal.

According to one aspect of this invention, the information processing device includes: a first wireless communication part that establishes one-to-one wireless communication with the portable terminal when the portable terminal is placed within a predetermined range; a display part on which a screen is displayed; a manipulation part that receives a user operation; a screen controller that updates the screen displayed on the display part based on the user operation received by the manipulation part; a tag information storage that stores therein tag information which is sent to the portable terminal when the first wireless communication part establishes wireless communication with the portable terminal; and a tag information updating part that updates the tag information depending on the screen displayed on the display part by the screen controller. The portable terminal includes: a second wireless communication part that establishes one-to-one wireless communication with the information processing device when the first wireless communication part is placed within a predetermined range; and a controller that performs an operation depending on the screen displayed at the information processing device based on the tag information received from the information processing device when the second wireless communication part establishes wireless communication with the information processing device.

Second, the present invention is directed to an information processing device communicating with a portable terminal.

According to one aspect of this invention, the information processing device, comprises: a wireless communication part that establishes one-to-one wireless communication with the portable terminal when the portable terminal is placed within a predetermined range; a display part on which a screen is displayed; a manipulation part that receives a user operation; a screen controller that updates the screen displayed on the display part based on the user operation received by the manipulation part; a tag information storage that stores therein tag information which is sent to the portable terminal when the wireless communication part establishes wireless communication with the portable terminal; and a tag information updating part that updates the tag information depending on the screen displayed on the display part by the screen controller.

Third, the present invention is directed to a portable terminal capable of communicating with an information processing device updating a screen based on a user operation.

According to one aspect of this invention, the portable terminal, comprises: a program storage in which an application program to work in consistent with the information processing device is stored; a wireless communication part that establishes one-to-one wireless communication with the information processing device when the information processing device is placed within a predetermined range; and a controller that runs the application program based on tag information received from the information processing device when the wireless communication part establishes the wireless communication with the information processing device, and performs an operation depending on the screen displayed at the information processing device based on processing information included in the tag information after the application program is run.

Fourth, the present invention is directed to a non-transitory computer readable recording medium storing a program to be executed by an information processing device communicating with a portable terminal.

According to one aspect of this invention, the information processing device includes: a wireless communication part that establishes one-to-one wireless communication with the portable terminal when the portable terminal is placed within a predetermined range; a display part on which a screen is displayed; a manipulation part that receives a user operation; a screen controller that updates the screen displayed on the display part based on the user operation received by the manipulation part; and a tag information storage that stores therein tag information which is sent to the portable terminal when the wireless communication part establishes wireless communication with the portable terminal. Execution of the program by the information processing device causing the information processing device to function as a system comprises: a tag information updating part that updates the tag information in the tag information storage depending on the screen displayed on the display part by the screen controller.

Fifth, the present invention is directed to a non-transitory computer readable recording medium storing an application program to be executed by a portable terminal capable of communicating with an information processing device updating a screen based on a user operation.

According to one aspect of this invention, the portable terminal includes: a wireless communication part that establishes one-to-one wireless communication with the information processing device when the information processing device is placed within a predetermined range; and a controller that runs the application program based on tag information received from the information processing device when the wireless communication part establishes wireless communication with the information processing device. The application program causes the controller to perform an operation depending on the screen displayed at the information processing device based on processing information included in the tag information after the application program is run by the controller.

BRIEF DESCRIPTION OF THE DRAWINGS

FIG. 3 shows an example of tag information;

FIG. 4 shows an example of registration information;

FIG. 16 shows an example of the tag information when the multiple applications are run at the portable terminal one after another;

DESCRIPTION OF THE PRESENT PREFERRED EMBODIMENTS

Figure 1:
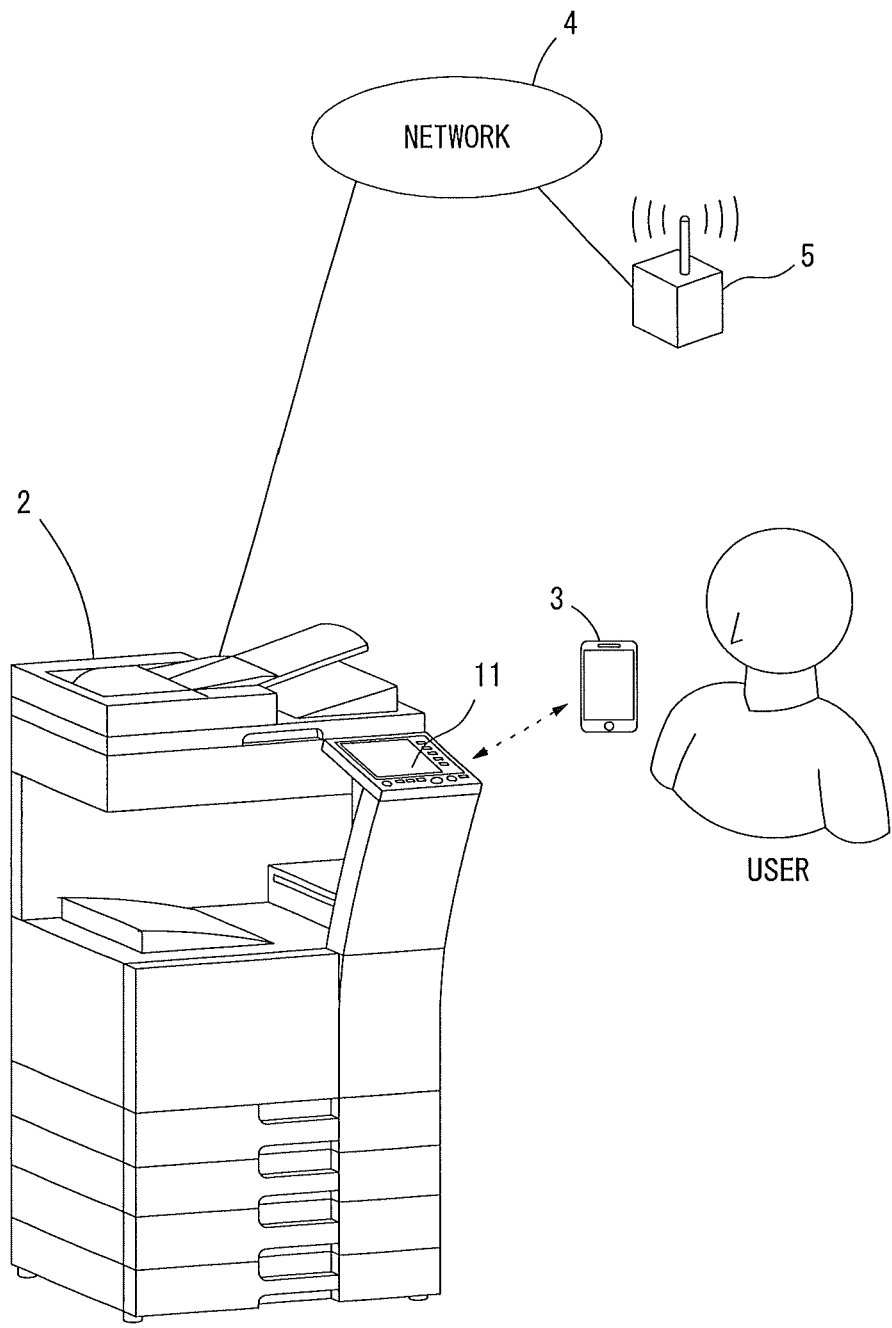
FIG. 1 shows an exemplary configuration of an information processing system.

A preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an information processing system 1 of the present preferred embodiment of the present invention. The information processing system 1 is comprising an information processing device 2, for instance, constructed by one of MFPs and a portable terminal 3 used by a user. The information processing system 1 causes the information processing device 2 and the portable terminal 3 to work in concert with each other.

The information processing device 2 having multiple functions such as a copy function, a scan function, a printing function, a facsimile function and a box function is capable of executing a job corresponding to each of the above-described functions. The information processing device 2 is, for example, connected to a network 4 such as a LAN (Local Area Network), and is capable of establishing communications with the other devices including the portable terminal 3 over the network 4. In the example of FIG. 1, the network 4 includes a wireless communications device 5 which functions as an access point of a wireless LAN such as Wi-Fi. The wireless communications device 5 may be loaded with the information processing device 2. The information processing device 2 has a near field communication function based on standards of NFC, for instance. The near field communication function realizes one-to-one wireless communications with a device which is placed within a predetermined range, which is different from the communications over the network 4. The information processing device 2 also has an authentication function to authenticate the user who is trying to use each of the aforementioned functions.

The portable terminal 3 is, for example, constructed by a smartphone or a tablet terminal. The portable terminal 3 stores therein a variety of application programs installed in advance. The application programs installed in advance include a program for realizing the cooperative operations with the information processing device 2. The portable terminal 3 has two wireless communication functions as functions to establish wireless communications. One is to establish communication over the network 4 by connecting to the wireless communications device 5 which is the access point of the wireless LAN, and another is to establish one-to-one near field communications with the device which is placed within the predetermined range based on the standards of NFC, for instance.

Figure 2:
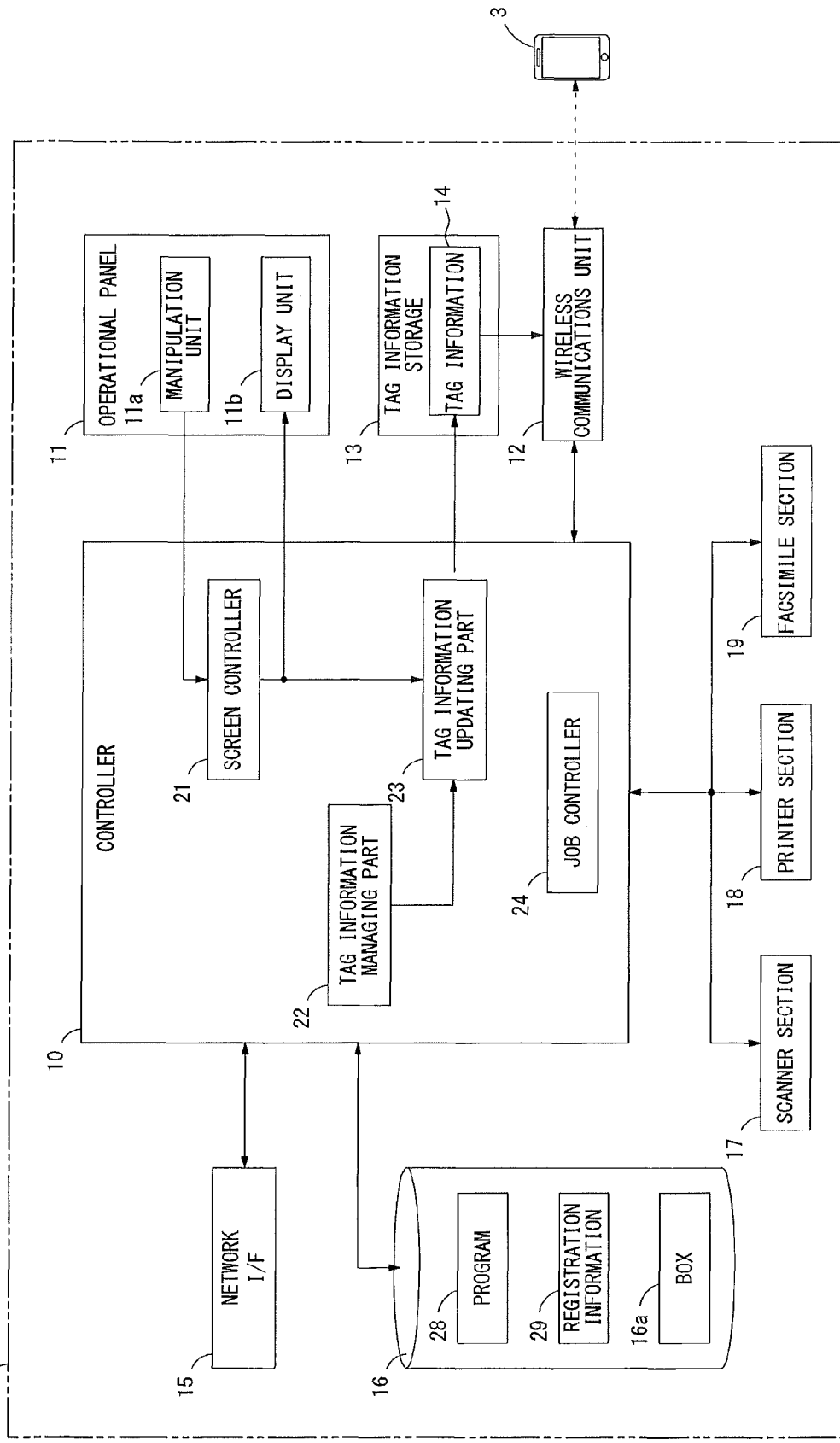
FIG. 2 is a block diagram showing an exemplary functional configuration of an information processing device.

FIG. 2 is a block diagram showing an exemplary functional configuration of the information processing device 2. The information processing device 2 includes a controller 10 comprising CPU and memory, an operational panel 11 being a user interface for user to operate the information processing device 2, a wireless communications unit 12, a tag information storage 13, a network interface 15, a storage 16 consisted of a non-transitory storage device such as a hard disk drive (HDD), a scanner section 17, a printer section 18 and a facsimile section 19.

The operational panel 11 includes a manipulation unit 11a and a display unit 11b. The manipulation unit 11a receives inputs by the user, and the display unit 11b is capable of displaying a screen for the user to operate. The display unit 11b is formed from a device such as a color liquid crystal display, for example. The manipulation unit 11a is formed with parts such as touch panel keys arranged on the screen of the display area of the display unit 11b and push-button keys arranged around the display area of the display unit 11b, for example.

The wireless communications unit 12 establishes one-to-one wireless communications with the device which is placed within the predetermined range based on the standards of NFC, for instance. The wireless communications unit 12 is embedded in a part near the operational panel 11, for example. It is assumed, for example, that the user brings the portable terminal 3 near the operational panel 11 as illustrated in FIG. 1 so that the portable terminal 3 is placed within the predetermined range to the wireless communications unit 12. In this case, the wireless communications unit 12 automatically detects the portable terminal 3, and starts the near field communications with the portable terminal 3. The wireless communications unit 12 is equivalent to a first wireless communication part.

The tag information storage 13 is formed from a semiconductor memory which is capable of rewriting information, for example. The tag information storage 13 stores therein tag information 14 sent to the portable terminal 3 when the wireless communications unit 12 establishes the wireless communications with the portable terminal 3. To be more specific, when detecting the portable terminal 3 and starting the near field communications, the wireless communications unit 12 reads the tag information 14 in the tag information storage 13 and sends the read tag information 14 to the portable terminal 3.

The network interface 15 connects the information processing device 2 to the network 4. The information processing device 2 is also allowed to communicate with the portable terminal 3 over the network 4 via the network interface 15.

The storage 16 stores therein a program 28 and registration information 29. The program 28 is executed by the controller 10. The registration information 29 is referred at update of the tag information 14 in the tag information storage 13. Information should be described in the tag information 14 is associated in advance with each of the multiple screens displayed on the display unit 11b, and the information and the corresponding screen are registered as the registration information 29. Moreover, the storage 16 includes at least one box 16a used with the box function. The box 16a is a storage region in which data such as document data and/or image data is stored. The box 16a is assigned to each user or each group.

The scanner section 17 is brought into operation when the copy function, the scan function or the facsimile function is used, for example. The scanner section 17 executes a scan job as a document is placed on an automatic document feeder (ADF) or a platen glass, thereby optically reading the document and generating the image data. The printer section 18 is brought into operation when the copy function, the printing function or the facsimile function is used, for example. The printer section 18 executes the print job, thereby producing a printed output by forming images on an output sheet based on the received image data. The facsimile section 19 transmits and receives fax data over public phone lines, which are not shown in FIG. 2.

The controller 10 controls the overall operations of each of the aforementioned parts. As the information processing device 2 is powered on, the controller 10 reads the program 28 in the storage 16 and executes the program 28. As a result, the controller 10 serves as various types of processing parts, however only the processing parts relating to the functions of the present preferred embodiment of the various types of processing parts are shown in FIG. 2. To be more specific, the controller 10 executes the program 28, thereby serving as a screen controller 21, a tag information managing part 22, a tag information updating part 23 and a job controller 24.

The screen controller 21 controls the screen displayed on the display unit 11b of the operational panel 11. After the information processing device 2 is powered on, the screen controller 21 displays an initial screen on the display unit 11b. Every time the manipulation unit 11a receives the user input, the screen controller 21 updates the screen on the display unit 11b depending on the user input. At every update of the screen displayed on the display unit 11b based on the user input, the screen controller 21 outputs the information relating to the screen updated to the tag information updating part 23.

The tag information managing part 22 manages the registration information 29 in the storage 16. In response to obtaining the registration information 29 from outside via the network interface 15, for example, the tag information managing part 22 stores the obtained registration information 29 in the storage unit 16 and manages. The tag information managing part 22 provides the tag information updating part 23 with the registration information 29 in the storage unit 16 as required.

The tag information updating part 23 writes the tag information 14 in the tag information storage 13, thereby storing the tag information 14. The tag information updating part 23 keeps the tag information 14 in the tag information storage 13 updated corresponding to the screen displayed on the display unit 11b by the screen controller 21. The screen controller 21 may display the initial screen on the display unit 11b, for example. In this case, the tag information updating part 23 stores the tag information 14 corresponding to the initial screen in the tag information storage 13. Every time the screen of the display unit 11b is switched to the one based on the user input by the screen controller 21, the tag information updating part 23 stores the tag information 14 corresponding to the switched screen in the tag information storage 13. To be more specific, the tag information updating part 23 controls the tag information 14 stored in the tag information storage 13 to be the information corresponding to the screen displayed on the display unit 11b based on the user input.

FIG. 3 shows an example of the tag information 14 stored in the tag information storage 13. The tag information 14 includes, for instance, connection information D1, startup information D2 and processing information D3. The connection information D1 includes communication settings of wireless LAN, for instance, which should be applied at the portable terminal 3 for communication over the network 4 with the information processing device 2 with the connection to the network 4. The startup information D2 identifies the application that should be run at the portable terminal 3. The processing information D3 designates the processing (action) should be performed on the application run at the portable terminal 3. The NFC standards, for instance, define the connection information D1 and the startup information D2 are standard information included in the tag information 14. According to the NFC standards, custom information may be added to the tag information 14 besides the standard information. The above-described processing information D3 is added to the tag information 14 as the custom information.

When the screen controller 21 updates the screen depending on the user input, the tag information updating part 23 rewrites the startup information D2 and the processing information D3 of the tag information 14 stored in the tag information storage 13 depending on the updated screen, thereby updating the tag information 14. To be more specific, the tag information updating part 23 changes the identification of the application which should be run at the portable terminal 3 or the processing (action) should be carried out on the application run at the portable terminal 3 depending on the screen displayed on the display unit 11b of the operational panel 11. The wireless communications unit 12 detects the portable terminal 3 and starts the near field communication. In this case, the wireless communications unit 12 is capable of reading the tag information 14 corresponding to the screen displayed on the display unit 11b at start of the near field communication in the tag information storage 13 and sending the read tag information 14 to the portable terminal 3.

For rewriting the startup information D2 and the processing information D3 of the tag information 14 depending on the screen, the tag information updating part 23 may analyze information such as contents on the screen, thereby generating the startup information D2 and the processing information D3 corresponding to the screen. It is assumed, for example, that the tag information updating part 23 is configured to analyze the information such as the contents on the new screen every time the screen is updated. In such a case, it requires the time for analysis so that the tag information updating part 23 is not allowed to update the tag information 14 in the tag information storage 13 efficiently. For rewriting the startup information D2 and the processing information D3 of the tag information 14 in response to update of the screen, the tag information updating part 23 preferably reads the registration information 29 stored in advance in the storage 16 via the tag information managing part 22. The tag information updating part 23 then preferably extracts the startup information D2 and the processing information D3 correspond to the current screen in the registration information 29, thereby updating the tag information 14.

FIG. 4 shows an example of the registration information 29. The screen displayed on the display unit 11b of the operational panel 11 and the information should be written in the startup information D2 and the processing information D3 of the tag information 14 when the screen is displayed are associated in advance, and the screen and the corresponding information are registered as the registration information 29. When the screen is updated, the tag information managing part 22 refers the registration information 29 as illustrated in FIG. 4, thereby immediately identifying the startup information D2 and the processing information D3 correspond to the current screen. The tag information managing part 22 rewrites the startup information D2 and the processing information D3 of the tag information 14 based on the information registered as the registration information 29, thereby efficiently rewriting and updating the tag information 14.

The job controller 24 controls operations of each parts, the network interface 15, the scanner section 17, the printer section 18, the facsimile section 19 and the box 16a, thereby controlling execution of the job specified by the user. In response to receiving the job execution instruction via the operational panel 11, the wireless communications unit 12 or the network interface 15, the job controller 24 starts execution of the job based on the instruction.

Figure 5:
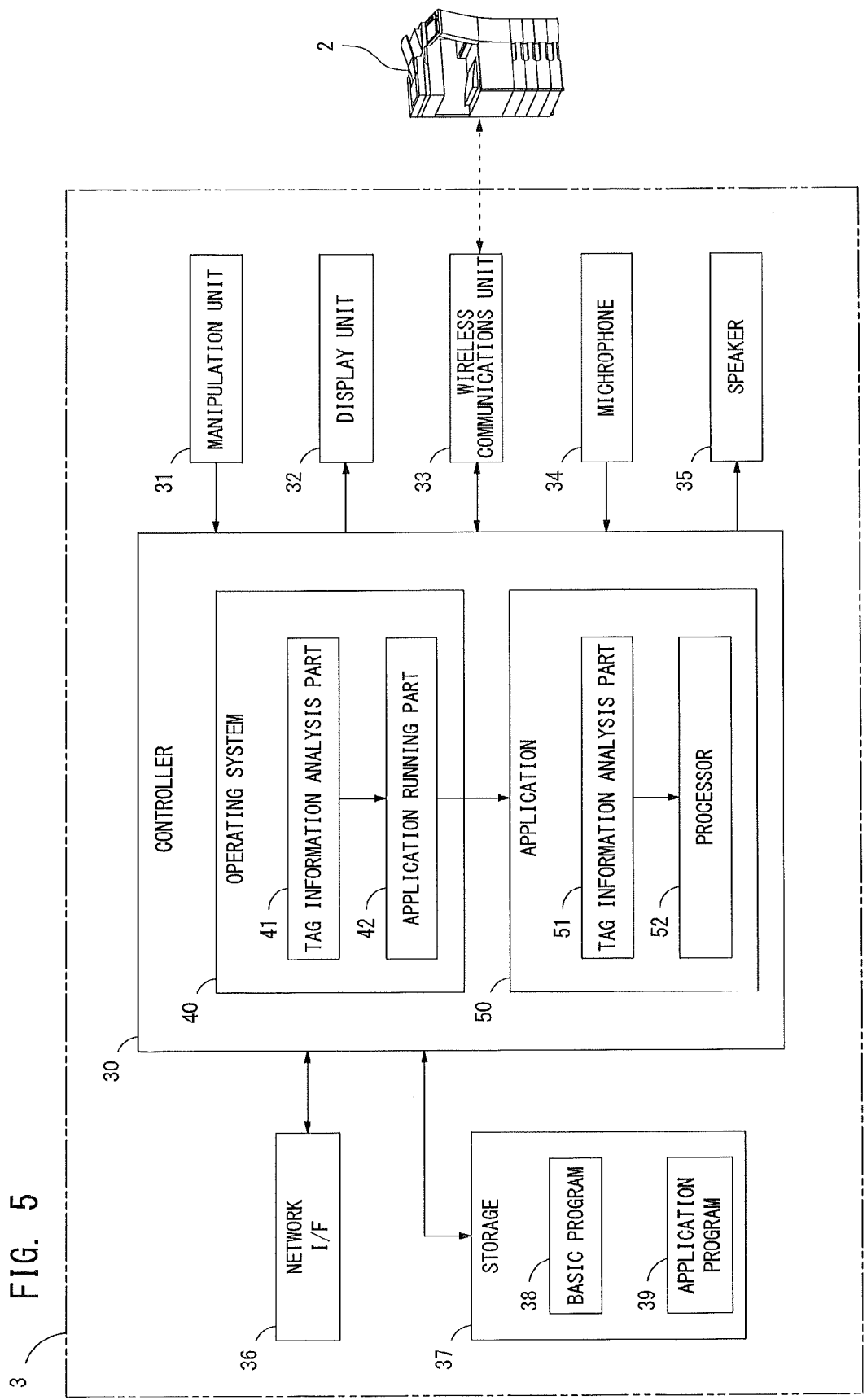
FIG. 5 is a block diagram showing an exemplary functional configuration of a portable terminal.

FIG. 5 is a block diagram showing an exemplary functional configuration of the portable terminal 3. The portable terminal 3 includes a controller 30, a manipulation unit 31, a display unit 32, a wireless communications unit 33, a microphone 34, a speaker 35, a network interface 36 and a storage 37. The controller 30 includes a CPU and a memory.

The user makes the inputs to the portable terminal 3 through the manipulation unit 31. A variety of information is displayed on the display unit 32 to the user. Voices are input with the microphone 34, and output through the speaker 35.

The display unit 32 is formed from a device such as a color liquid crystal display, for example. A variety of screens on which the user is allowed to make inputs are displayed on the display unit 32. The manipulation unit 31 is formed with parts such as touch panel keys arranged on the screen of the display area of the display unit 32, for example.

The wireless communications unit 33 establishes one-to-one wireless communications with the device which is placed within the predetermined range based on the standards of NFC. It is assumed, for example, that the wireless communications unit 12 of the information processing device 2 is placed near the portable terminal 3. In this case, the wireless communications unit 33 automatically detects the wireless communications unit 12, then starts the near field communications with the wireless communications unit 12 of the information processing device 2. The wireless communications unit 33 is equivalent to a second wireless communication part.

The network interface 36 connects the portable terminal 3 to the wireless communications device 5 which is the access point of the wireless LAN, and communicates with the other devices including the information processing device 2 over the network 4. More specifically, the network interface 36 is equivalent to a network communication part.

The storage 37 stores therein a basic program 38 and an application program 39 as programs executed by the controller 30. After the portable terminal 3 is powered on, the controller 30 automatically reads and executes the basic program 38 in the storage 37. The controller 30 executes the basic program 38, thereby serving as an operating system 40. The controller 30 executes the application program 39 as the operating system 40 is brought into operation. The controller 30 executes the application program 39, thereby serving as an application 50. The application 50 performs the cooperative processing with the information processing device 2. According to the present preferred embodiment, the different application program 39 is configured to be run for each function worked together with the information processing device 2. Multiple application programs 39 corresponding to the respective functions are stored in advance in the storage 37.

The operating system 40 serves as a tag information analysis part 41 and an application running part 42. After the wireless communications unit 33 starts establishing one-to-one wireless communications with the information processing device 2, the tag information analysis part 41 analyzes the tag information 14 received from the information processing device 2. The tag information analysis part 41 analyzes the connection information D1 and the startup information D2 included in the tag information 14 as the standard information based on the standards of NFC, for example. The communication settings of the wireless LAN, for instance, which should be applied at the portable terminal 3 may be included in the connection information D1 as a result of the analysis. In this case, the operating system 40 applies the communication settings to the network interface 36, thereby connecting the portable terminal 3 to the network 4, and allowing the portable terminal 3 to communicate with the information processing device 2 over the network 4. If the application that should be run at the portable terminal 3 is identified with the startup information D2, the operating system 40 brings the application running part 42 into operation. The application running part 42 reads and runs the application program 39 corresponding to the application identified with the startup information D2 in the storage 37. Through this process, the application 50 becomes operative on the controller 30.

The application 50 includes a tag information analysis part 51 and a processor 52. The tag information analysis part 51 analyzes the processing information D3 which is attached to the tag information 14 received from the information processing device 2 as the custom information, thereby designating the processing (action) that should be performed by the application 50. After the processing to be performed is designated by the tag information analysis part 51, the processor 52 is brought into operation next. The processor 52 automatically performs the processing designated with the processing information D3. The processor 52 performs the processing depending on the screen displayed on the display unit 11b of the information processing device 2. More specifically, the processor 52 automatically performs the processing suitable for the current screen displayed at the information processing device 2.

After the portable terminal 3 automatically runs the application 50, it is not put into a standby state as the initial screen of the application 50 is displayed on the display unit 32. Instead of that, the portable terminal 3 is capable of automatically proceeding to the state in which the screen on which the user should make the operation next is displayed. Any user operation may not be necessary after the application 50 is run automatically. In this case, the portable terminal 3 is allowed to automatically proceed all processing and operate in concert with the information processing device 2. Some examples of operations that the portable terminal 3 and the information processing device 2 work in concert with each other are explained next.

Figure 6:
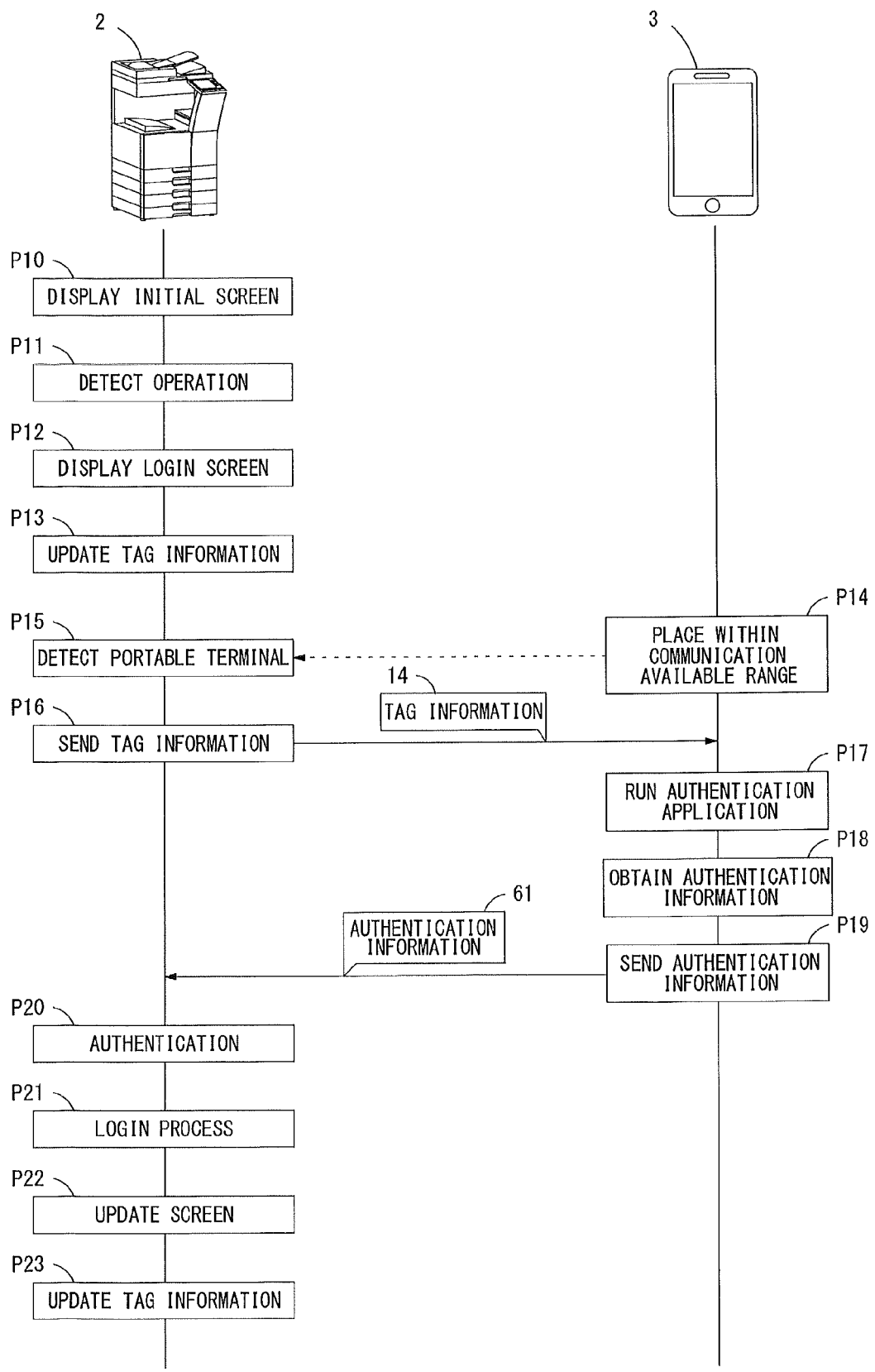
FIG. 6 is a flow diagram explaining an exemplary sequential procedure of a cooperative operation performed when an authentication application is run at the portable terminal.
Figure 7A:
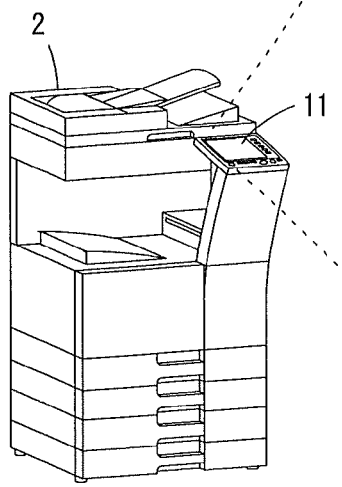
FIGS. 7A and 7B show an example of screens displayed at the information processing device.
Figure 7B:
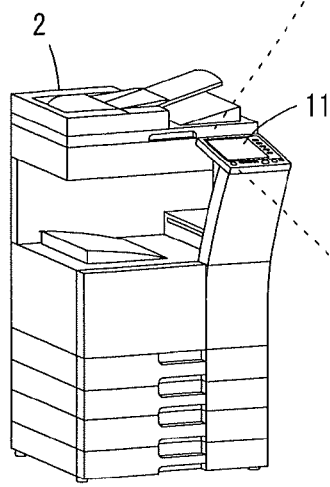

FIGS. 6, 7A and 7B show an example of the cooperative operation performed when an authentication application is run at the portable terminal 3. FIG. 6 is a flow diagram explaining an exemplary sequential procedure of the cooperative operation. FIGS. 7A and 7B show an example of the screens displayed at the information processing device 2. As illustrated in FIG. 6, as the initial screen after powered-on is being displayed (process P10), the information processing device 2 detects the user operation (process P11). In this case, the information processing device 2 activates an authentication function. Together with the activation of the authentication function, the screen controller 21 updates the screen on the display unit 11b to a login screen G10 as shown in FIG. 7A from the initial screen (process P12). The login screen G10 asks the user to make some inputs required for login to the information processing device 2. A blank input area for a user name and a password, for instance, is displayed. After the login screen G10 is displayed, the tag information updating part 23 rewrites each of the startup information D2 and the processing information D3 of the tag information 14 stored in the tag information storage 13 in accordance with the login screen G10, thereby updating the tag information 14 (process P13). Through this process P13, the tag information 14 including the startup information D2 identifying the startup of the authentication application and the processing information D3 instructing the authentication application to obtain authentication information and send to the information processing device 2 as shown in FIG. 3, for example, is stored in the tag information storage 13.

The user may bring the portable terminal 3 near the operational panel 11 so that the information processing device 2 and the portable terminal 3 are placed within the predetermined range in which they are capable of establishing the near field communications with each other (process P14). The information processing device 2 then detects the portable terminal 3 with which it is allowed to communicate (process P15). The information processing device 2 sends the tag information 14 in the tag information storage 13 to the portable terminal 3 via the near field communication (process P16). In response to receiving the tag information 14 from the information processing device 2, the portable terminal 3 executes the application program 39 corresponding to the authentication application based on the startup information D2 included in the received tag information 14, thereby running the application 50 (process P17). The application 50 automatically performs the sequential procedure defined in the processing information D3 included in the tag information 14. To be more specific, the application 50 corresponding to the authentication application obtains authentication information 61 including the user name and/or the password of the user from a predetermined storage region based on the processing information D3 (process P18), then sends the obtained authentication information 61 to the information processing device 2 (process P19). The portable terminal 3 may send the authentication information 61 to the information processing device 2 via the near field communication. Alternatively, the portable terminal 3 may send the authentication information 61 to the information processing device 2 over the network 4 to which it has connected based on the connection information D1 included in the tag information 14. As a result, the information processing device 2 is allowed to automatically obtain the information that should be input into the input area of the user name and the password of the login screen G10. In response to receiving the authentication information 61, the information processing device 2 is allowed to automatically input the user name and the password included in the authentication information 61 into the input area of the user name and the password of the login screen G10.

After receiving the authentication information 61 from the portable terminal 3, the information processing device 2 performs an authentication of authenticating whether or not the user who is trying to use the information processing device 2 is one of registered users (process P20). The information processing device 2, for example, sends an authentication request with the authentication information 61 received from the portable terminal 3 to an external authentication server over the network 4, and determines if the user is one of the registered users based on the authentication result received from the authentication server. The user may not be the registered user. In this case, the information processing device 2 does not carries out the following process, and returns the screen of the display unit 11b to the initial screen. The information processing device 2 then completes the process. The user may be the registered user. In this case, the information processing device 2 performs a login process to entering to a login state which is available for the user (process P21). The information processing device 2 then updates the screen of the display unit 11b to a screen G11 shown in FIG. 7B from the login screen G10 shown in FIG. 7A (process P22). More specifically, the user operates the operational panel 11 of the information processing device 2 so that the login screen G10 as shown in FIG. 7A is displayed on the display unit 11b. As the login screen G10 is being displayed on the display unit 11b, the user brings his or her portable terminal 3 near the operational panel 11. The information processing device 2 and the portable terminal 3 then start operating in concert with each other, and automatically perform the following processes. The user is allowed to switch the screen of the display unit 11b from the login screen G10 to the screen G11 which should be displayed after log-in without operating the operational panel 11 as the login screen G10 is being displayed. The screen controller 21 updates from the login screen G10 to the screen G11. The information processing device 2 then brings the tag information updating part 23 into operation to update the tag information 14 stored in the tag information storage 13 to that corresponding to the screen G11 (process P23).

Figure 8:
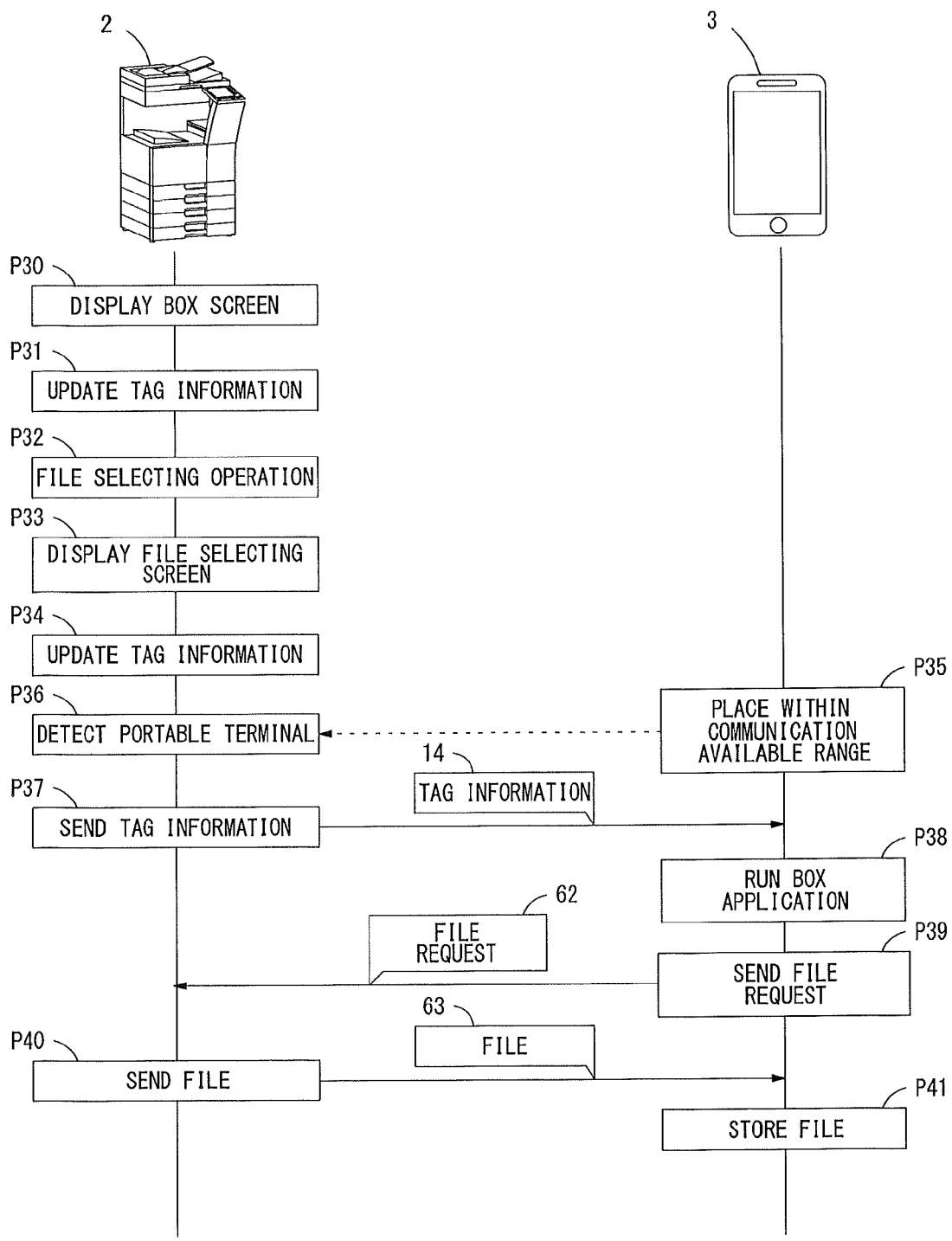
FIG. 8 is a flow diagram explaining an exemplary sequential procedure of the cooperative operation performed when a box application is run at the portable terminal.
Figure 9A:
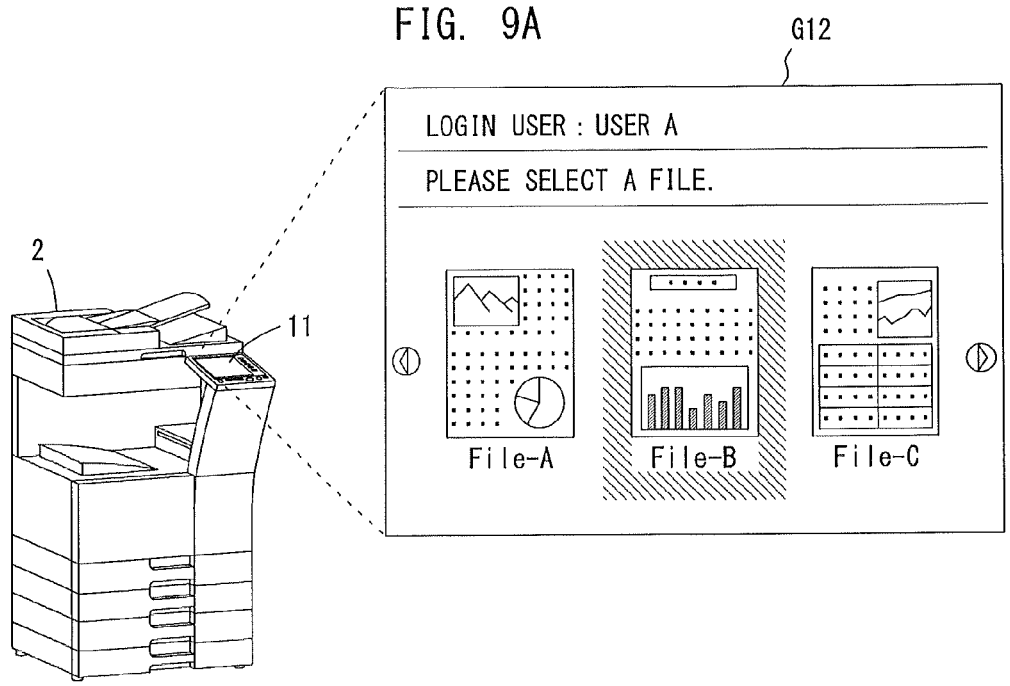
FIGS. 9A and 9B show an example of the screens displayed at the information processing device and the portable terminal.
Figure 9B:
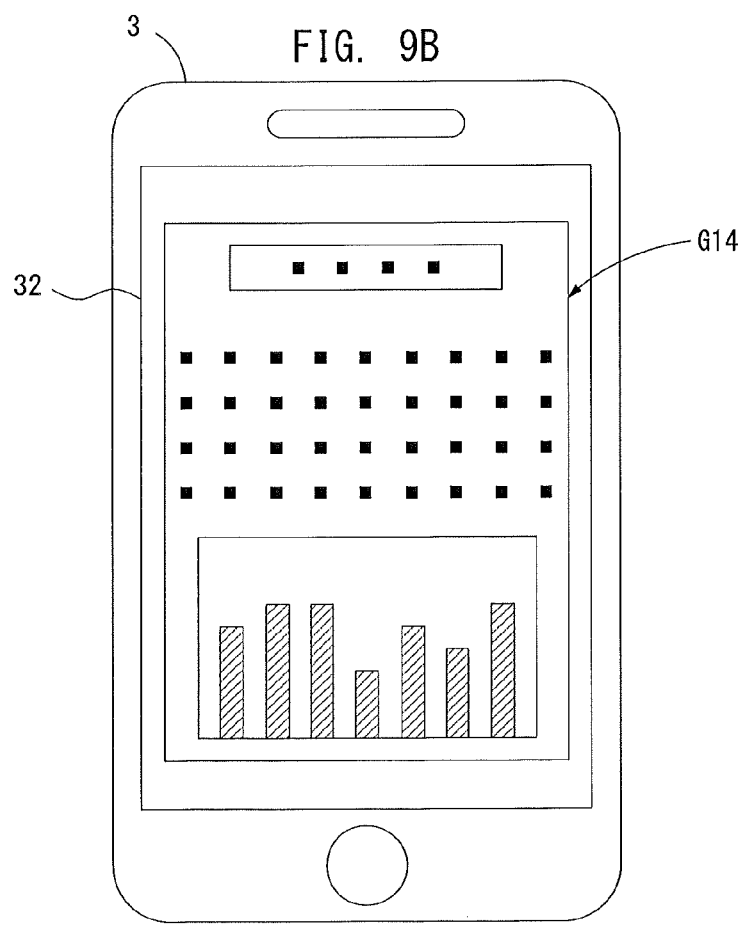

FIGS. 8, 9A and 9B show an example of the cooperative operation performed when a box application is run at the portable terminal 3. FIG. 8 is a flow diagram explaining an exemplary sequential procedure of the cooperative operation. FIGS. 9A and 9B show an example of the screens displayed at the information processing device 2 and the portable terminal 3. As the box function is selected by the logged-in user of the information processing device 2, the screen controller 21 displays a box screen on the display unit 11b of the operational panel 11 (process P30). Together with the display of the box screen, the tag information updating part 23 updates the tag information 14 stored in the tag information storage 13 depending on the box screen (process P31). Information of a list of files stored in the box 16a to which the user has an access is displayed on the box screen, for example. After detecting the user operation to select the file on the box screen (process P32), the screen controller 21 updates the box screen to a file selecting screen which shows that at least one of the files is selected (process P33). FIG. 9A shows an example of a file selecting screen G12 displayed on the display unit 11b. As referring to FIG. 9A, "File-B" is selected by the user. The screen controller 21 updates the screen of the display unit 11b to the file selecting screen G12. The tag information updating part 23 then updates the tag information 14 stored in the tag information storage 13 to that corresponding to the file selecting screen G12 (process P34). Through the process P34, the startup information D2 and the processing information D3 corresponding to the file selecting screen G13 as shown in FIG. 4, for instance, is written on the tag information 14 stored in the tag information storage 13. To be more specific, the startup information D2 identifying the startup of the application program 39 corresponding to the box application and the processing information D3 defining the processing that should be performed by the box application is written on the tag information 14.

The user may bring the portable terminal 3 near the operational panel 11 so that the information processing device 2 and the portable terminal 3 are placed within the predetermined range in which they are capable of establishing the near field communications with each other (process P35). The information processing device 2 then detects the portable terminal 3 with which it is allowed to communicate (process P36). The information processing device 2 sends the tag information 14 in the tag information storage 13 to the portable terminal 3 via the near field communication (process P37). In response to receiving the tag information 14 from the information processing device 2, the portable terminal 3 executes the application program 39 corresponding to the box application based on the startup information D2 included in the received tag information 14, thereby running the application 50 (process P38). The application 50 automatically performs the sequential procedure defined in the processing information D3 included in the tag information 14. To be more specific, the application 50 corresponding to the box application sends a file request 62 to obtain the file selected by the user to the information processing device 2 based on the processing information D3 (process P39). It is preferable for the portable terminal 3 to send the file request 62 to the information processing device 2 over the network 4 to which it has connected based on the connection information D1 included in the tag information 14. That is because, the communication over the network 4 allows high-speed communication which is faster than the near field communication. For obtaining a large amount of data such as the large file, the communication over the network 4 allows the portable terminal 3 to obtain the file more efficiently than the near field communication. In response to receiving the file request 62 from the portable terminal 3, the information processing device 2 reads a file 63 selected by the user in the box 16a, and sends the read file 63 to the portable terminal 3 over the network 4 (process P40). After receiving the file 63 from the information processing device 2, the portable terminal 3 stores the received file 63 in the storage 37 (process P41). A screen G14 showing an image based on the file 63 obtained from the information processing device 2 is then displayed on the display unit 32 of the portable terminal 3 as illustrated in FIG. 9B.

As described above, the user operates the operational panel 11 of the information processing device 2 so that the file selecting screen G12 as shown in FIG. 9A is displayed on the display unit 11b. As the file selecting screen G12 is being displayed on the display unit 11b, the user brings his or her portable terminal 3 near the operational panel 11. The portable terminal 3 automatically runs the application 50 corresponding to the box application, and the information processing device 2 and the portable terminal 3 start operating in concert with each other to automatically perform the following processes. After the application 50 corresponding to the box application is run, it is not necessary for the user to repeatedly make operations to display the information of the list of the files to the application 50, or select the desired file from among the list of the files. The user is allowed to download the file 63 selected in advance to the portable terminal 3 efficiently with the operations to the operational panel 11. It is not necessary for the user to make complicated operations on the small screen of the portable terminal 3, resulting in improvement in operability compared to the conventional systems.

Figure 10:
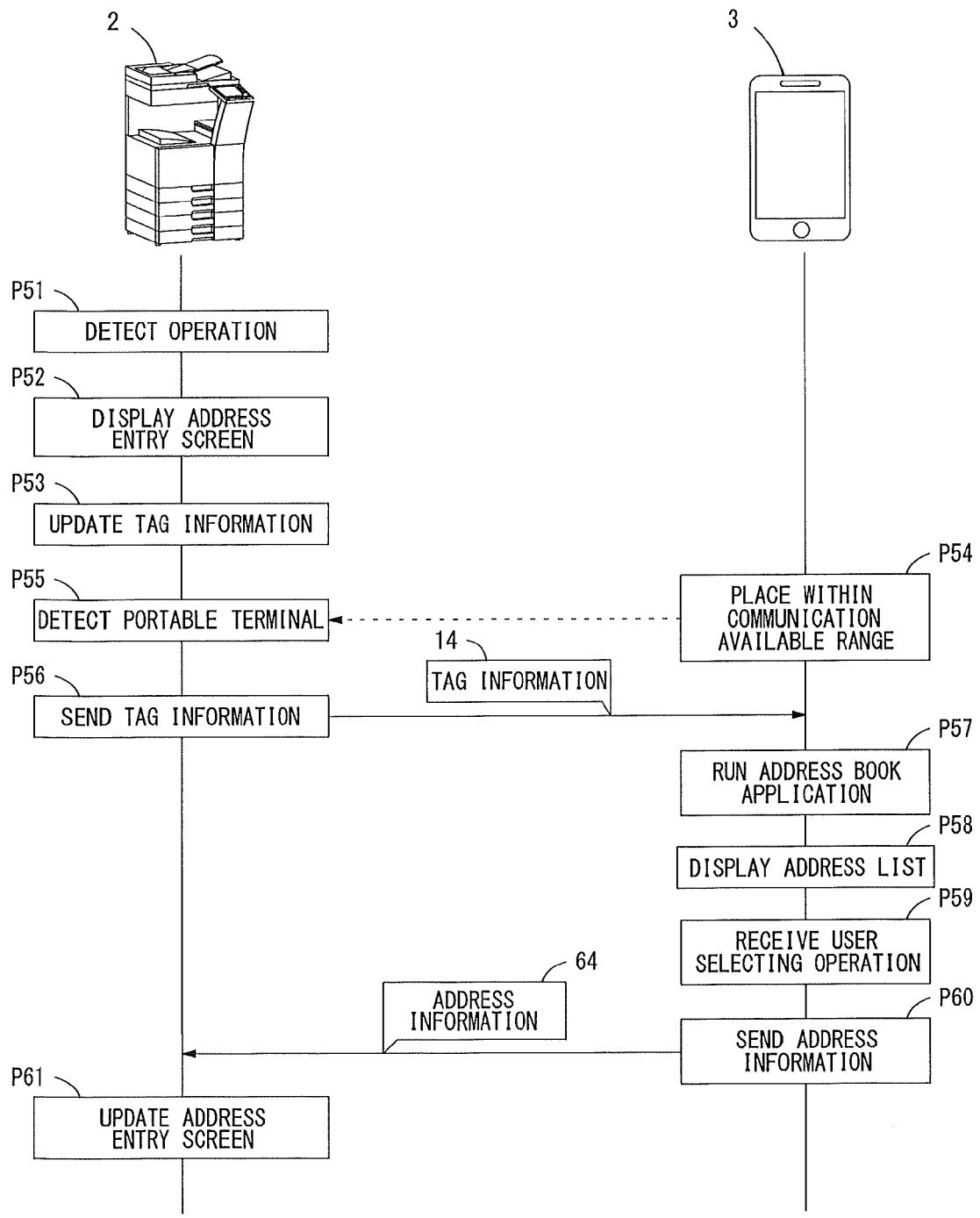
FIG. 10 is a flow diagram explaining an exemplary sequential procedure of the cooperative operation performed when an address book application is run at the portable terminal.
Figure 11A:
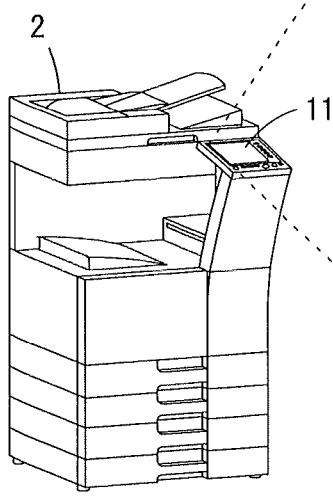
FIGS. 11A and 11B show an example of the screens displayed at the information processing device.
Figure 11B:
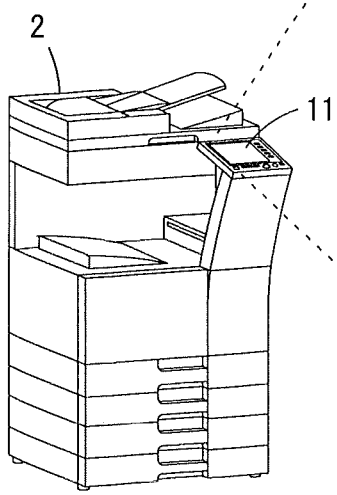

FIGS. 10, 11A and 11B show an example of the cooperative operation performed when an address book application is run at the portable terminal 3. FIG. 10 is a flow diagram explaining an exemplary sequential procedure of the cooperative operation. FIGS. 11A and 11B show an example of the screens displayed at the information processing device 2. As the logged-in user configures the settings of an address, for example (process P51), the screen controller 21 displays an address entry screen G15 as illustrated in FIG. 11A on the display unit 11b (process P52). The address entry screen G15 asks the user to entry the address. A blank address entry area 65 for information such as an email address, for instance, is shown. After the address entry screen G15 is displayed, the tag information updating part 23 rewrites each of the startup information D2 and the processing information D3 of the tag information 14 stored in the tag information storage 13 in accordance with the address entry screen G15, thereby updating the tag information 14 (process P53). Through this process P53, the startup information D2 and the processing information D3 corresponding to the address entry screen G15 is written on the tag information 14 in the tag information storage 13 as illustrated in FIG. 4, for example. To be more specific, the startup information D2 identifying the startup of the application program 39 corresponding to the address book application and the processing information D3 defining the process that should be performed by the address book application are written on the tag information 14.

The user may bring the portable terminal 3 near the operational panel 11 so that the information processing device 2 and the portable terminal 3 are placed within the predetermined range in which they are capable of establishing the near field communications with each other (process P54). In this case, the information processing device 2 detects the portable terminal 3 with which it is allowed to communicate (process P55). The information processing device 2 sends the tag information 14 in the tag information storage 13 to the portable terminal 3 via the near field communication (process P56). In response to receiving the tag information 14 from the information processing device 2, the portable terminal 3 executes the application program 39 corresponding to the address book application based on the startup information D2 included in the received tag information 14, thereby running the application 50 (process P57). The application 50 automatically performs the sequential procedure defined in the processing information D3 included in the tag information 14. To be more specific, the application 50 corresponding to the address book application displays a list of addresses registered with the portable terminal 3 on the display unit 32 based on the processing information D3 (process P58), and receives the user operation of selecting the address (process P59). The application 50 sends address information 64 selected from among the list of the addresses by the user to the information processing device 2 (process P60). The portable terminal 3 may send the address information 64 to the information processing device 2 via the near field communication. Alternatively, the portable terminal 3 may send the address information 64 to the information processing device 2 over the network 4 to which it has connected based on the connection information D1 included in the tag information 14. In response to receiving the address information 64 selected by the user from the portable terminal 3, the information processing device 2 automatically inputs the address information 64 into the address entry area 65 of the address entry screen G15, thereby automatically updating to an address entry screen G16 as shown in FIG. 11B (process P61).

As described above, the user operates the operational panel 11 of the information processing device 2 so that the address entry screen G15 as shown in FIG. 11A is displayed on the display unit 11b. As the address entry screen G15 is being displayed on the display unit 11b, the user brings his or her portable terminal 3 near the operational panel 11. The portable terminal 3 automatically runs the application 50 corresponding to the address book application, and the information processing device 2 and the portable terminal 3 start operating in concert with each other to automatically perform the following processes. After the application 50 corresponding to the address book application is run, it is not necessary for the user to make operations one by one from the initial screen of the application 50. Even without the user operations, the list of the addresses is automatically shown soon after the application 50 is run. After the user selects the desired address from among the list of the addresses, the address information 64 corresponding to the selected address is sent to the information processing device 2 from the portable terminal 3. The address information 64 is then automatically input in the address entry area 65 of the address entry screen G15 displayed on the operational panel 11. The user is allowed to update the address entry screen G15 as he or she desired with a minimum operation which is selection of the address made on the small screen of the portable terminal 3, resulting in improvement in operability compared to the conventional systems.

Figure 12:
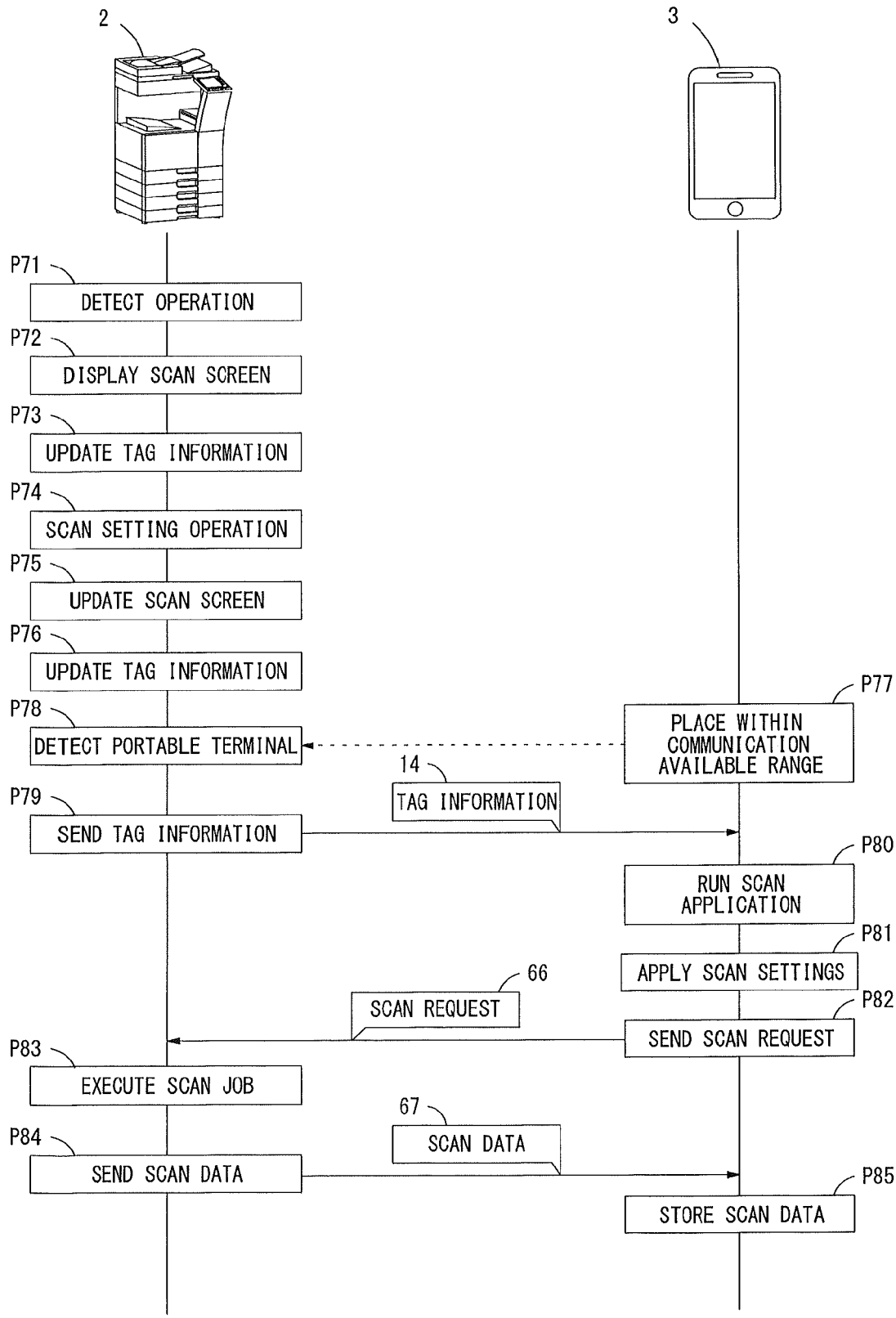
FIG. 12 is a flow diagram explaining an exemplary sequential procedure of the cooperative operation performed when a scan application is run at the portable terminal.

FIG. 12 is a flow diagram explaining an exemplary sequential procedure of the cooperative operation performed after a scan application is run at the portable terminal 3. After detecting the logged-in user operation of selecting the scan function as the document is placed on the automatic document feeder or the platen glass (process P71), the screen controller 21 of the information processing device 2 displays a scan screen on the display unit 11b (process P72). The screen controller 21 displays the scan screen which is showing setting values of various types of setting items relating to document reading set at default values. After the scan screen is displayed by the screen controller 21, the tag information updating part 23 updates the tag information 14 in the tag information storage 13 depending on the scan screen (process P73). Through this process P73, the startup information D2 and the processing information D3 corresponding to the scan screen is written on the tag information 14 in the tag information storage 13 as illustrated in FIG. 4, for instance. To be more specific, the startup information D2 identifying the startup of the application program 39 corresponding to the scan application and the processing information D3 defining the process that should be performed by the scan application is written on the tag information 14. In the example of FIG. 4, the process to automatically apply the scan settings to the scan application run at the portable terminal 3 is defined in the processing information D3. In order to apply the scan settings to the scan application run at the portable terminal 3, the tag information updating part 23 attaches the setting values of the various types of the setting items displayed on the scan screen, for example, with the tag information 14.

After the scan screen is displayed on the display unit 11b, the user is allowed to configure the scan settings to change the setting values of the various types of the setting items for document reading to the desired setting values. In response to detecting the scan settings operation by the user (process P74), the screen controller 21 updates the scan screen based on the scan settings operation (process P75). More specifically, the screen controller 21 changes the setting values of the various types of the setting items to the setting values configured by the user, and updates the scan screen. The tag information updating part 23 then updates the tag information 14 stored in the tag information storage 13 to that corresponding to the scan screen updated by the screen controller 21 (process P76). The tag information updating part 23 rewrites the setting values of the various types of the setting items included in the tag information 14, for instance, to the setting values configured by the user, thereby updating the tag information 14.

The user may bring the portable terminal 3 near the operational panel 11 so that the information processing device 2 and the portable terminal 3 are placed within the predetermined range in which they are capable of establishing the near field communications with each other (process P77). In this case, the information processing device 2 detects the portable terminal 3 with which it is allowed to communicate via the near field communications (process P78). The information processing device 2 sends the tag information 14 in the tag information storage 13 to the portable terminal 3 via the near field communication (process P79). In response to receiving the tag information 14 from the information processing device 2, the portable terminal 3 executes the application program 39 corresponding to the scan application based on the startup information D2 included in the received tag information 14, thereby running the application 50 (process P80). The application 50 automatically performs the sequential procedure defined in the processing information D3 included in the tag information 14. To be more specific, the application 50 corresponding to the scan application applies the scan settings based on the processing information D3 (process P81), More specifically, the tag information 14 received from the information processing device 2 includes information relating to the scan settings configured by the user through the operations on the operational panel 11. The application 50, therefore, changes its scan settings based on the information relating to the scan settings. The application 50 then sends a scan request 66 to the information processing device 2 (process P82). The application 50 sends the scan request 66 with the information relating to the scan settings which were applied in process P81. The information attached by the application 50 to the scan request 66 includes information to instruct transmission of scan data generated by a scan job to the portable terminal 3. The portable terminal 3 preferably sends the scan request 66 to the information processing device 2 over the network 4 to which it has connected based on the connection information D1 included in the tag information 14. That is because, the communication over the network 4 allows high-speed communication compared to the near field communication. Also, for obtaining the large amount of scan data, the communication over the network 4 allows the portable terminal 3 to obtain the data more efficiently than the near field communication.

In response to receiving the scan request 66 from the portable terminal 3, the information processing device 2 brings the job controller 24 into operation. The job controller 24 starts executing the scan job in response to the scan request 66 (process P83). The job controller 24 changes the setting values of the various types of the setting items based on the information relating to the scan settings included in the scan request 66, then executes the scan job based on the changed setting values. More specifically, the job controller 24 automatically configures the address of the scan data generated by reading the document with the portable terminal 3, and starts execution of the scan job. After generating scan data 67, the job controller 24 sends the scan data 67 to the portable terminal 3 over the network 4 (process P84). In response to receiving the scan data 67 over the network 4 from the information processing device 2, the application 50 of the portable terminal 3 stores the received scan data 67 (process P85).

As described above, the user operates the operational panel 11 of the information processing device 2 so that the scan screen is displayed on the display unit 11b. As the scan screen is being displayed on the display unit 11b, the user brings his or her portable terminal 3 near the operational panel 11. Then, the portable terminal 3 automatically runs the application 50 corresponding to the scan application, and the information processing device 2 and the portable terminal 3 start operating in concert with each other to automatically perform the following processes. After the application 50 corresponding to the scan application is automatically run at the portable terminal 3, it is not necessary for the user to make operations. Even without the user operations, the scan request 66 which designates the portable terminal 3 as the address of the scan data is automatically sent to the information processing device 2. As a result, the information processing device 2 executes the scan job, and the portable terminal 3 is allowed to obtain and store therein the scan data 67 thereby generated. The user is allowed to download the desired scan data to the portable terminal 3 efficiently without making operations on the small screen of the portable terminal 3, resulting in improvement in operability compared to the conventional systems.

Figure 13:
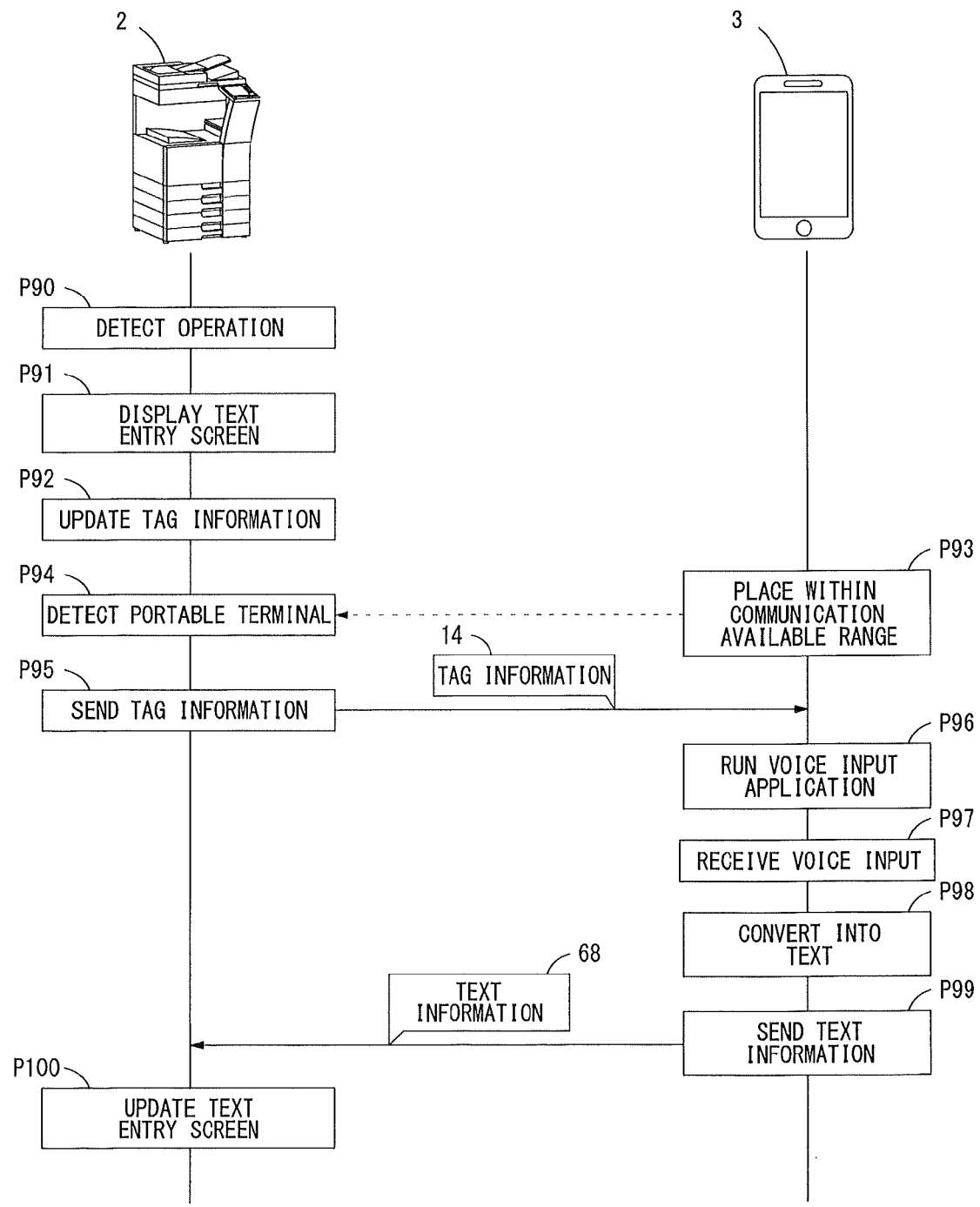
FIG. 13 is a flow diagram explaining an exemplary sequential procedure of the cooperative operation performed when a voice input application is run at the portable terminal.
Figure 14A:
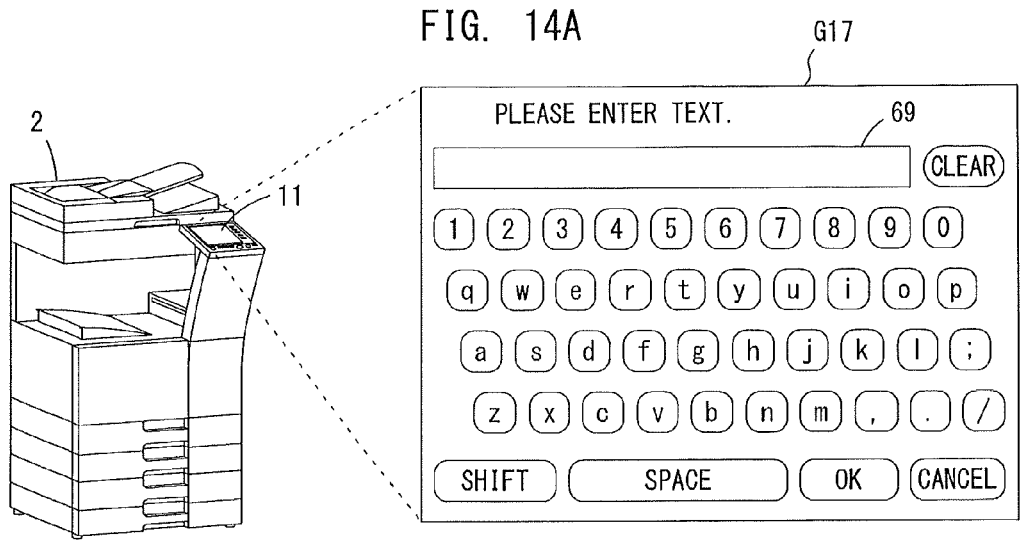
FIGS. 14A, 14B and 14C show an example of the screens displayed at the information processing device and the portable terminal.
Figure 14B:
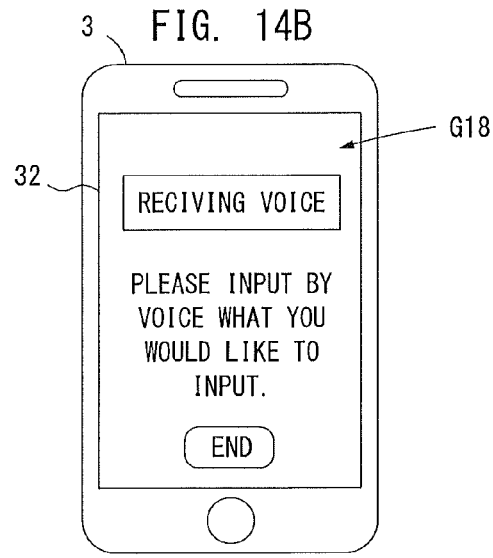
Figure 14C:
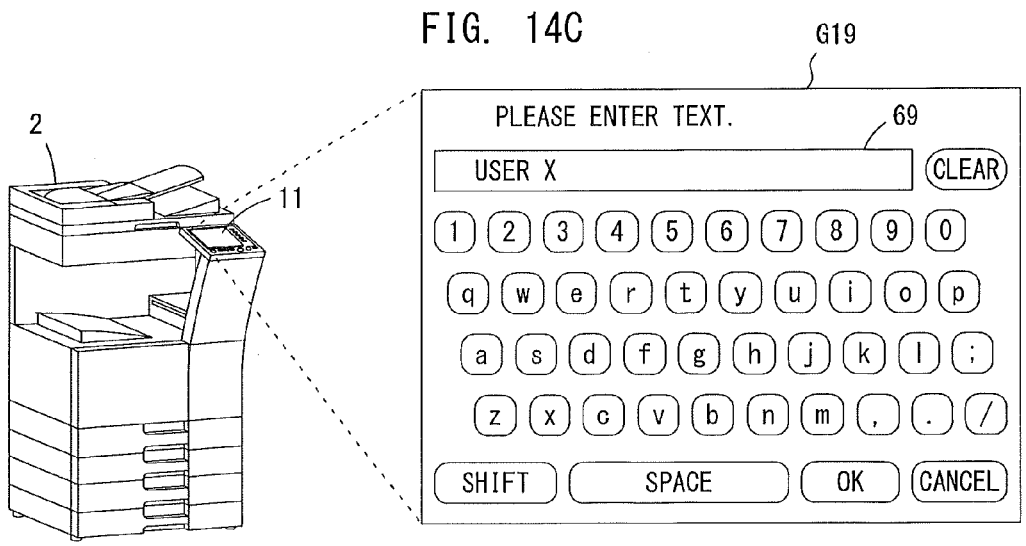

FIGS. 13, 14A, 14B and 14C show an example of the cooperative operation performed when a voice input application is run at the portable terminal 3. FIG. 13 is a flow diagram explaining an exemplary sequential procedure of the cooperative operation. FIGS. 14A, 14B and 14C show an example of the screens displayed at the information processing device 2 and the portable terminal 3. As the logged-in user inputs the text, for example (process P90), the screen controller 21 of the information processing device 2 displays a text entry screen G17 as illustrated in FIG. 14A on the display unit 11b (process P91). The text entry screen G17 asks the user to entry any character string. A blank text area 69 and a keyboard image operable for the user, for instance, are shown. After the text entry screen G17 is displayed, the tag information updating part 23 rewrites each of the startup information D2 and the processing information D3 of the tag information 14 stored in the tag information storage 13 in accordance with the text entry screen G17, thereby updating the tag information 14 (process P92). Through this process P92, the startup information D2 and the processing information D3 corresponding to the text entry screen 017 as illustrated in FIG. 4, for example are written on the tag information 14 in the tag information storage 13. To be more specific, the startup information D2 identifying the startup of the application program 39 corresponding to the voice input application and the processing information D3 defining the process that should be performed by the voice input application are written on the tag information 14.

The user may bring the portable terminal 3 near the operational panel 11 so that the information processing device 2 and the portable terminal 3 are placed within the predetermined range in which they are capable of establishing the near field communications with each other (process P93). In this case, the information processing device 2 detects the portable terminal 3 with which it is allowed to communicate (process P94). The information processing device 2 sends the tag information 14 in the tag information storage 13 to the portable terminal 3 via the near field communication (process P95). In response to receiving the tag information 14 from the information processing device 2, the portable terminal 3 executes the application program 39 corresponding to the voice input application based on the startup information D2 included in the received tag information 14, thereby running the application 50 (process P96). The application 50 automatically performs the sequential procedure defined in the processing information D3 included in the tag information 14. To be more specific, the application 50 corresponding to the voice input application displays a voice input screen G18 as shown in FIG. 14B on the display unit 32 of the portable terminal 3 based on the processing information D3, and receives the input of user's voice via the microphone 34 (process P97). After the application 50 is run, it starts receiving the input of user's voice even without user's operation. The application 50 then converts voice signals input by the user into text information (process P98). The application 50 may refer data such as dictionary data installed in advance on the portable terminal 3 to convert the voice signals into the text information. The dictionary data is such a large amount of data, so sometimes it is difficult to install in advance on the portable terminal 3. In such cases, the application 50 may access an external server, for example, thereby using the external server to convert the voice signals to the text information. The application 50 sends text information 68 generated through the above-described conversion to the information processing device 2. As the volume of the text information 68 is not so large, the portable terminal 3 sends the text information 68 to the information processing device 2 via the near field communication. Alternatively, the portable terminal 3 may send the text information 68 to the information processing device 2 over the network 4. In response to receiving the text information 68, the information processing device 2 automatically inputs the text information 68 into the text area 69 of the text entry screen G17, thereby automatically updating to a text entry screen G19 as shown in FIG. 14C (process P100).

As described above, the user operates the operational panel 11 of the information processing device 2 so that the text entry screen G17 as shown in FIG. 14A is displayed on the display unit 11b. As the text entry screen G17 is being displayed on the display unit 11b, the user brings his or her portable terminal 3 near the operational panel 11. The portable terminal 3 automatically runs the application 50 corresponding to the voice input application, and the information processing device 2 and the portable terminal 3 start operating in concert with each other to automatically perform the following processes. After the application 50 corresponding to the voice input application is run, it is not necessary for the user to make operations one by one from the initial screen of the application 50. Even without the operations, the user is allowed to input voice soon after the application 50 is run. After the user inputs voice to the portable terminal 3, the text information 68 corresponding to the input voice is automatically sent to the information processing device 2 from the portable terminal 3. The text information 68 is then automatically input into the text area 69 of the text input screen G17 displayed on the operational panel 11. The user is allowed to update the text input screen G17 as he or she desires only with input of the voice without inputting text on the small screen of the portable terminal 3, resulting in improvement in operability compared to the conventional systems.

An example when the user places the portable terminal 3 within a range in which it is capable of communicating with the information processing device 2 so that the information processing device 2 runs multiple applications one after the other on the portable terminal 3 is described next. It is assumed, for example, the user logs into the information processing device 2 and operates the operational panel 11. The user selects the scan function to configure the document reading settings, then additionally selects an OCR (Optical Character Recognition) function to configure the OCR process on the scan data. The OCR function is selected to convert the scan data into a data format which allows text searching such as a searchable PDF. In such a case, the display controller 21 display the scan screen on the display unit 11b of the operational panel 11 and receives the scan settings by the user. The display controller 21 then displays an OCR screen based on the user operation of selecting the OCR function. The OCR settings configured by the user are received, and a series of operations of OCR operations are configured as a job after the document reading. When the OCR screen is displayed after the scan screen by the display controller 21, the tag information updating part 23 generates the tag information 14 to cause the portable terminal 3 to run the OCR application and performing a predetermined process after running the scan application and perform a predetermined process. The tag information updating part 23 then stores the generated tag information 14 in the tag information storage 13.

Figure 15:
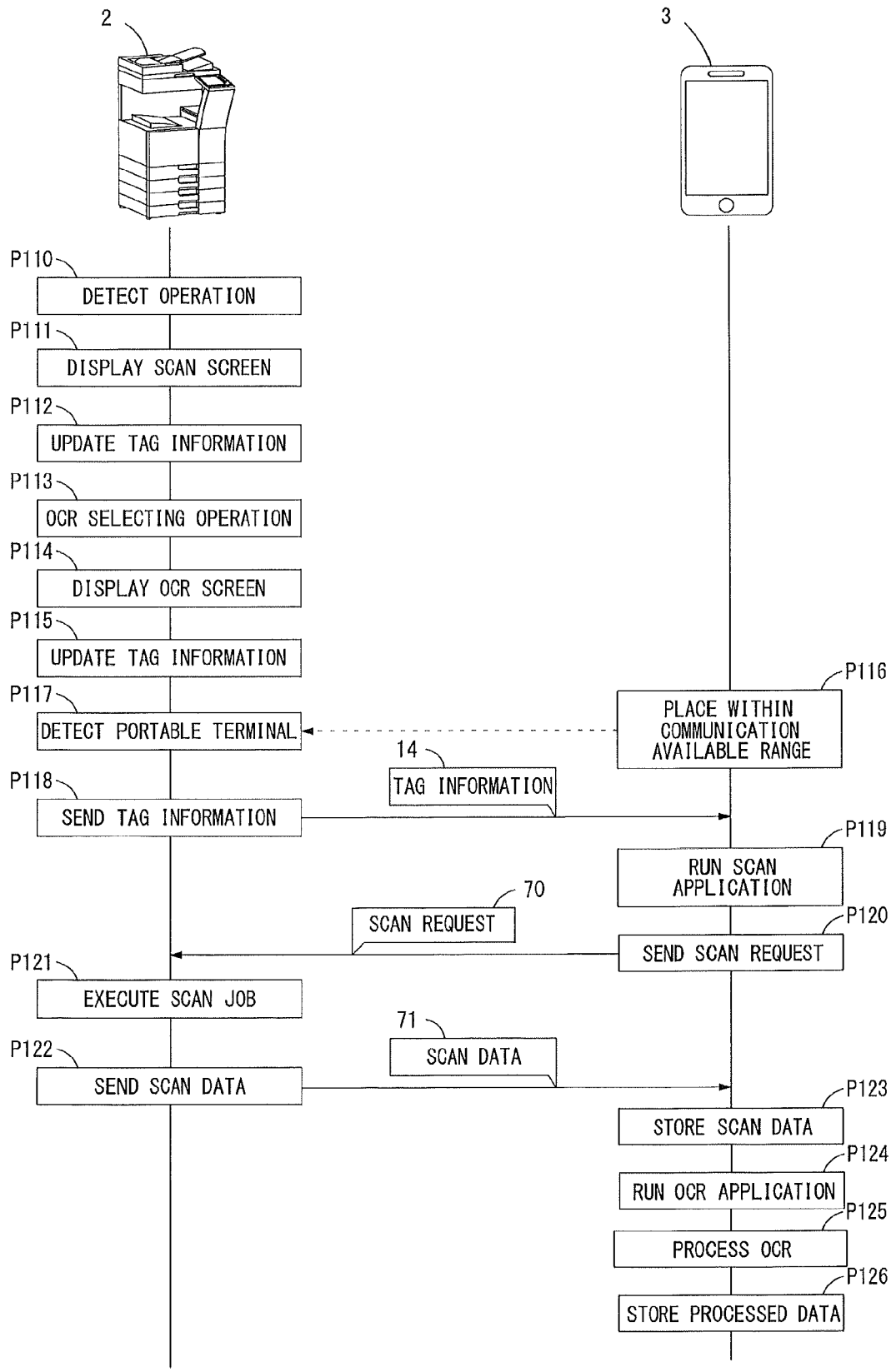
FIG. 15 is a flow diagram explaining an exemplary sequential procedure of the cooperative operation performed when the scan application and an OCR application are run one after another at the portable terminal.

FIG. 15 is a flow diagram explaining an exemplary sequential procedure of the cooperative operation performed when the scan application and the OCR application are run one after another at the portable terminal 3. After detecting the logged-in user operation of selecting the scan function as the document is placed on the automatic document feeder or the platen glass (process P110), the screen controller 21 of the information processing device 2 displays the scan screen on the display unit 11*b* (process P111). After the scan screen is displayed by the screen controller 21, the tag information updating part 23 updates the tag information 14 in the tag information storage 13 to that depending on the scan screen (process P112). The user may select the OCR process as the process on the scan data while the scan screen is being displayed on the display unit 11*b* (process P113). In this case, the screen controller 21 switches the screen of the display unit 11*b* from the scan screen to the OCR screen and displays the OCR screen (process P114). The scan settings configured by the user are retained. After the OCR screen is displayed by the screen controller 21, the tag information updating part 23 updates the tag information 14 in the tag information storage 13 to that corresponding to the OCR screen (process P115).

In order to run the scan application and the OCR application one after another at the portable terminal 3, the tag information updating part 23 generates the tag information as shown in FIG. 16 and stores in the tag information storage 13. To be more specific, the tag information updating part 23 writes the information relating to the scan application that should be run at first at the portable terminal 3 is written on the startup information D2. The tag information updating part 23 writes each processing that should be performed by the scan application on the processing information D3. The tag information updating part 23 then writes the information relating to the OCR application that should be run next at the portable terminal 3 is written on the processing information D3, and writes each processing that should be performed by the OCR application on the processing information D3. As a result, the tag information 14 as illustrated in FIG. 16 is generated. In response to receiving the tag information 14, the operating system 40 reads and executes the application program 39 corresponding to the scan application based on the startup information D2, thereby running the application 50 corresponding to the scan application.

It is assumed, that both the information relating to the scan application and the information relating to the OCR application are written on the startup information D2. In this case, in response to receiving the tag information 14, the operating system 40 runs the multiple applications 50 corresponding to the respective scan and OCR applications at the same time. Even if the OCR application is run at the portable terminal 3, the scan data to be processed via OCR is not stored in the portable terminal 3. When the application 50 corresponding to the OCR application automatically performs the processing defined in the processing information D3, the operations are terminated because of an error. To be more specific, for running the multiple application programs at the portable terminal 3 one after another, the tag information updating part 23 writes the information to run the first application program on the startup information D2, and writes the information to run the next application program on the processing information D3. This prevents the aforementioned error.

The tag information 14 as shown in FIG. 16 is stored in the tag information storage 13. In this case, the user may bring the portable terminal 3 near the operational panel 11 so that the portable terminal 3 is placed within the predetermined range in which the information processing device 2 and the portable terminal 3 are capable of establishing the near field communications with each other (process P116). The information processing device 2 then detects the portable terminal 3 with which it is allowed to communicate via the near field communication (process P117). The information processing device 2 sends the tag information 14 in the tag information storage 13 to the portable terminal 3 via the near field communication (process P118). In response to receiving the tag information 14 from the information processing device 2, the portable terminal 3 executes the application program 39 corresponding to the scan application based on the startup information D2 included in the received tag information 14, thereby running the application 50 (process P119). The application 50 automatically performs the sequential procedure defined in the processing information D3 included in the tag information 14. As a result, the application 50 corresponding to the scan application sends a scan request 70 to the information processing device 2 (process P120). The scan request 70 thereby sent includes the information which designates the portable terminal 3 as the address of the scan data as described above.

In response to receiving the scan request 70 from the portable terminal 3, the information processing device 2 brings the job controller 24 into operation to start execution of the scan job (process P121). After generating scan data 71, the job controller 24 sends the generated scan data 71 to the portable terminal 3 over the network 4 (process P122). In response to receiving the scan data 71 over the network 4 from the information processing device 2, the application 50 corresponding to the scan application run at the portable terminal 3 stores the received scan data 71 based on the processing information D3 (process P123). The application 50 corresponding to the scan application reads the application program 39 corresponding to the OCR application and causes the controller 30 to executes the program based on the processing information D3, thereby running the application 50 corresponding to the OCR application (process P124). The application 50 corresponding to the OCR application reads the stored scan data and processes OCR (process P125). The application 50 corresponding to the OCR application stores the processed data generated through the OCR, and completes the process (process P126).

As described above, the user operates the operational panel 11 of the information processing device 2 so that the scan screen is displayed on the display unit 11*b*, and he or she configures the scan settings. After configuration of the scan settings, the user brings his or her portable terminal 3 near the operational panel 11 with giving an instruction to perform the OCR on the scan data. Then, the portable terminal 3 runs the application 50 corresponding to the scan application and the application 50 corresponding to the OCR application one after another, and the information processing device 2 and the portable terminal 3 start operating in concert with each other to automatically perform the following processes. After the application 50 corresponding to the scan application is automatically run at the portable terminal 3, it is not necessary for the user to make operations. Even without the user operations, the scan request 70 which designates the portable terminal 3 as the address of the scan data is automatically sent to the information processing device 2. As a result, the information processing device 2 executes the scan job, and the portable terminal 3 is allowed to obtain and store therein the scan data 71 thereby generated. Also even after the application 50 corresponding to the OCR application is automatically run, it is not necessary for the user to make operations. Even without the user operations, the process on the scan data 71 can be automatically performed and the processed data can be stored in the portable terminal 3. The user is allowed to store the desired scan data in the portable terminal 3 efficiently without making operations on the small screen of the portable terminal 3, resulting in improvement in operability compared to the conventional systems.

Figure 17:
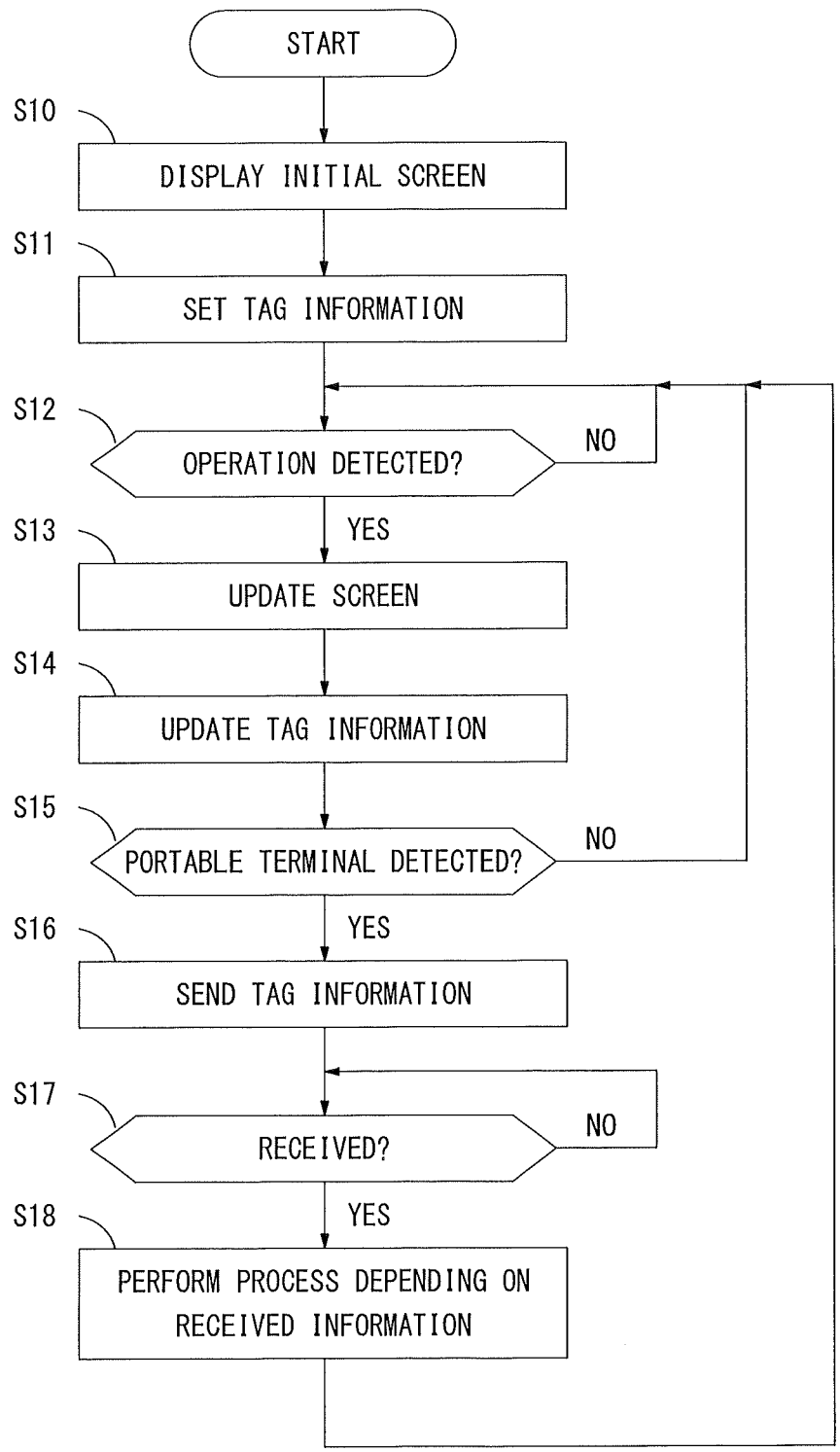
FIG. 17 is a flow diagram explaining an exemplary sequential procedure of a process performed at the information processing device.

A sequential procedure of the process performed at the information processing device 2 is explained next. FIG. 17 is a flow diagram explaining an exemplary sequential procedure of the process performed at the information processing device 2. Upon the start of the process, the information processing device 2 displays the initial screen on the display unit 11*b* of the operational panel 11 (step S10). Together with the display of the initial screen, the tag information updating part 23 sets the tag information 14 corresponding to the initial screen in the tag information storage 13 (step S11). The information processing device 2 enters the standby state for some kind of user operation on the operational panel 11 (step S12). In response to detecting the user operation (when a result of step S12 is YES), the screen controller 21 updates the screen displayed on the display unit 11*b* depending on the user operation (step S13). Also, the tag information updating part 23 updates the tag information 14 stored in the tag information storage 13 depending on the screen displayed on the display unit 11*b* (step S14).

The information processing device 2 determines whether or not the wireless communications unit 12 has detected the portable terminal 3 which is capable of establishing the near field communications with each other (step S15). The portable terminal 3 may not be detected (when a result of step S15 is NO). In such a case, the information processing device 2 returns to the process in step S12 to repeat the above-described process. More specifically, the information processing device 2 repeatedly performs the process in steps S12 to S14, thereby updating the tag information 14 in the tag information storage 13 depending on the screen displayed on the display unit 11*b* every time the screen on the display unit 11*b* is updated based on the user operation.

The portable terminal 3 may be detected (when a result of step S15 is YES). In such a case, the information processing device 2 sends the tag information 14 stored at the detection in the tag information storage 13 to the portable terminal 3 (step S16). After the tag information 14 is sent, the information processing device 2 enters the standby state for the receipt of the information from the portable terminal 3 (step S17). In response to receiving the information from the portable terminal 3, the information processing device 2 performs the processing depending on the received information (step S18). The received information may be the scan request, for example. In this case, the information processing device 2 brings the job controller 24 into operation to execute the scan job and generate the scan data. The job controller 24 then sends the generated scan data to the portable terminal 3 over the network 4. The information processing device 2 then returns to the process in step S12 to repeat the above-described process.

Figure 18A:
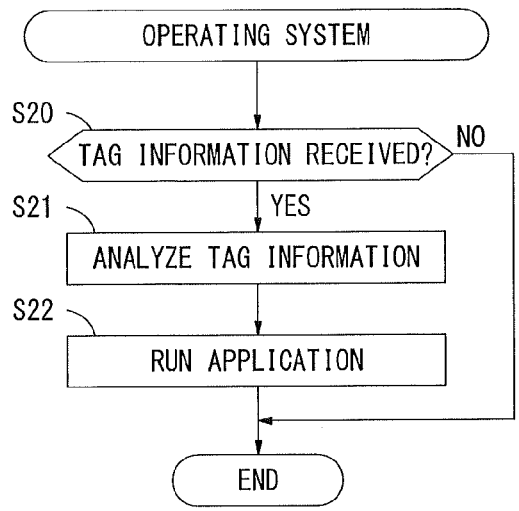
FIGS. 18A and 18B are flow diagrams explaining an exemplary sequential procedure of the process performed at the information processing device.
Figure 18B:
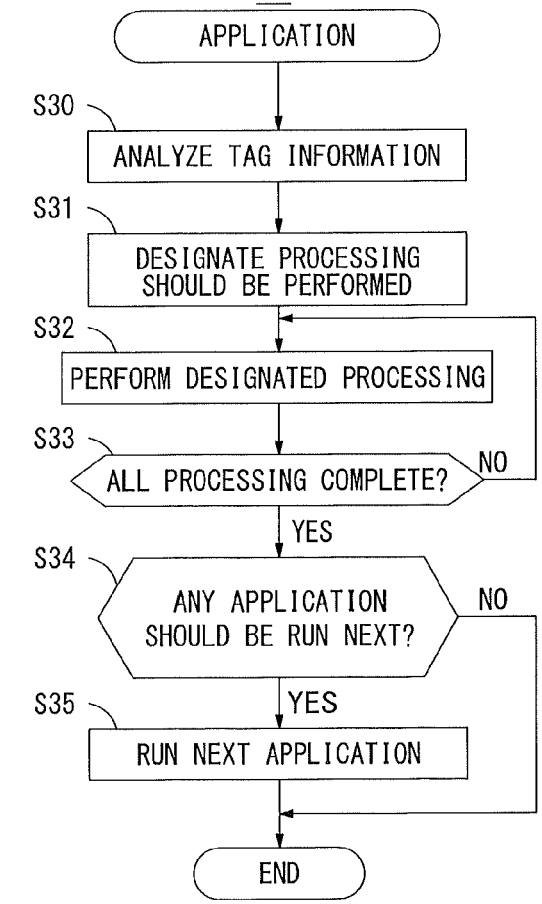

A sequential procedure of the process performed at the portable terminal 3 is explained next. FIGS. 18A and 18B are flow diagrams explaining an exemplary sequential procedure of the processes performed at the portable terminal 3. FIG. 18A is a flow diagram explaining an exemplary sequential procedure of the process performed by the operating system 40, and FIG. 18B is a flow diagram explaining an exemplary sequential procedure of the process performed by the application 50.

The sequential procedure of the process performed by the operating system 40 is explained at first. The operating system 40 repeats the process based on the flow diagram of FIG. 18A every predetermined period of time. More specifically, upon the start of the process, the operating system 40 determines whether or not the wireless communications unit 33 has received the tag information 14 (step S20). No tag information 14 may be received (when a result of step S20 is NO). In this case, the process by the operating system 40 is complete. The tag information 14 may be received (when a result of step S20 is YES). In this case, the operating system 40 causes the tag information analysis part 41 to analyze the tag information 14 and identify the application program 39 that should be run based on the startup information D2 included in the received tag information 14 (step S21). The operating system 40 brings the application running part 42 into operation. The application running part 42 reads and executes the application program 39 identified by the tag information analysis part 41 in the storage 37, thereby running the application 50 identified with the tag information 14 (step S22). As described above, the process by the operating system 40 is complete.

The sequential procedure of the process performed by the application 50 is explained next. After the application 50 is run on the controller 30, the application 50 brings the tag information analysis part 51 into operation to analyze the processing information D3 included in the tag information 14 received from the information processing device 2 as shown in FIG. 18B (step S30). The tag information analysis part 51 designates the processing that should be performed by the application 50 based on the processing information D3 (step S31). The application 50 then brings the processor 52 into operation. The processor 52 performs the processing designated by the tag information analysis part 51 (step S32). The processor 52 determines if the whole processing that should be performed by the application 50 of the processing defined in the processing information D3 has been complete (step S33). The whole processing may not be complete yet (when a result of step S33 is NO). In this case, the processor 52 returns to step S32 to perform the next process. The processor 52 performs the processing defined in the processing information D3 one by one. When the whole processing that should be performed by the application 50 is complete (when a result of step S33 is YES), the processor 52 determines whether or the application that should be run next is identified with the processing information D3 (step S34). The application that should be run next may not be identified with the processing information D3 (when a result of step S34 is NO). In this case, the processing that should be performed by the application 50 running on the controller 30 is complete. The application that should be run next may be identified with the processing information D3 (when a result of step S34 is YES). In this case, the application 50 reads the application program 39 corresponding to the identified application in the storage 37 and executes the read application program 39 on the controller 30, thereby running the next application (step S35). Thus, the process by the application 50 is complete. After the next application 50 is run in step S35, the new application 50 performs the process based on the flow diagram of FIG. 18B from the beginning.

The above-described processes are performed at the respective devices, the information processing device 2 and the portable terminal 3. The user operates the operational panel 11 of the information processing device 2, and the screen displayed on the display unit 11*b* is proceeded to the state that the information is shown or the corresponding information has already input in the certain area, for example. As the screen is proceeded to the certain state, the user brings the portable terminal 3 within the predetermined range in which it is capable of establishing the near field communications with the information processing device 2. As a result, this minimizes the operations that should be made to the portable terminal 3. More specifically, the portable terminal 3 automatically runs the application 50 corresponding to the screen displayed on the operational panel 11 of the information processing device 2. Moreover, the application 50 automatically proceeds the processing corresponding to the screen displayed on the operational panel 11. As a result, it is not necessary for the user to operate one after the other from the initial screen of the application 50 after the application 50 is run. Hence, the less number of the operations that should be made by the user to the portable terminal 3 is required. This extremely improves the operability for cooperative operations between the information processing device 2 and the portable terminal 3.

A display size of the screen displayed on the operational panel 11 of the information processing device 2 is generally bigger than the screen displayed on the portable terminal 3. It is easier for the user to use the operational panel 11 than the portable terminal 3 because the screen size of the operational panel 11 is bigger than the portable terminal 3. It is not only easier for the user but also it eliminates the errors when the user inputs the information. It is assumed, for example, the screen sizes of the portable terminal 3 and the operational panel 11 are almost the same. Even in such a case, the screen displayed when the application 50 is run at the portable terminal 3 may be displayed differently from the screen displayed on the operational panel 11. It, therefore, is easier for the user to use the operational panel 11 than the portable terminal 3 to give instructions to the application 50 because the user is more familiar with the operational panel 11. This also helps elimination of the errors. Hence, the information processing system 1 of the present preferred embodiment is capable of improving the operability for the cooperative operations between the information processing device 2 and the portable terminal 3. Furthermore, the information processing system 1 is capable of causing the information processing device 2 and the portable terminal 3 to work in consistent with each other efficiently.

As described above, after the information processing device and the portable terminal start the wireless communications, the portable terminal automatically performs the operations depending on the screen displayed at the information processing device. This reduces the number of the operations that should be made by the user. As a result, the operability for the cooperative operations between the information processing device and the portable terminal is improved, and the information processing device and the portable terminal may be caused to work in consistent with each other efficiently.

(Modifications)

While the preferred embodiment of the present invention has been described above, the present invention is not limited to the preferred embodiment. Various modifications may be applied to the present invention.

The information processing device 2 of the above-described present preferred embodiment is shown to be one of MFPs that include multiple functions such as the copy function, the scan function, the printing function, the facsimile function and the box function. The information processing device 2 of the present invention is not necessarily the device such as the MFPs. The information processing device 2 may be a device other than the MFP.

According to the above-described present preferred embodiment, multiple application programs 39 are stored in the storage 37 of the portable terminal 3, and the different application program 39 is run at the portable terminal 3 depending on the screen displayed on the operational panel 11. However, this is given not for limitation. Only one application program 39 for the cooperative operations with the information processing device 2 may be stored in the portable terminal 3. In this case, even when the screen displayed on the operational panel 11 switches depending on the user operation, the application program 39 automatically run at the portable terminal 3 is always the same.

Even in such a case, the processing performed by the application 50 differs for each screen displayed on the operational panel 11 after the application program 39 is executed and the application 50 is run.

According to the above-described present preferred embodiment, some examples of the cooperative operations between the information processing device 2 and the portable terminal 3 for each of some screens displayed on the operational panel 11 of the information processing device 2 are described. Various types of the screens other than the aforementioned screens are displayed on the operational panel 11 of the information processing device 2. The information processing device 2 is capable of causing the portable terminal 3 to perform the processing corresponding to the screen even when the screen other than the aforementioned screens is displayed on the operational panel 11.

What is claimed is:

1. An information processing system comprising an information processing device and a portable terminal, wherein
said information processing device includes:
a first wireless communication part that establishes one-to-one wireless communication with said portable terminal when said portable terminal is placed within a predetermined range;
a display part on which a screen is displayed;
a manipulation part that receives a user operation;
a first hardware processor that updates the screen displayed on said display part based on the user operation received by said manipulation part; and
a tag information storage that stores therein tag information which is sent to said portable terminal when said first wireless communication part establishes wireless communication with said portable terminal,
said first hardware processor updates said tag information depending on the updated screen every time the screen displayed on said display part is updated based on the user operation received by said manipulation part, and
said portable terminal includes:
a second wireless communication part that establishes one-to-one wireless communication with said information processing device when said first wireless communication part is placed within a predetermined range; and
a second hardware processor that performs an operation depending on the screen displayed at said information processing device based on said tag information received from said information processing device when said second wireless communication part establishes wireless communication with said information processing device.

2. The information processing system according to claim 1, wherein
said portable terminal further includes a program storage in which an application program to work in concert with said information processing device is stored, and
said second hardware processor runs the application program based on said tag information, and performs the operation depending on the screen displayed at said information processing device with a function of the application program.

3. The information processing system according to claim 2, wherein
said tag information includes startup information to run the application program at said portable terminal and processing information which defines a processing which should be performed at said portable terminal after the application program is run at said portable terminal, and
said first hardware processor updates at least said processing information or said startup information and said processing information depending on the screen displayed on said display part.

4. The information processing system according to claim 3, wherein
said second hardware processor runs the application program based on said startup information in said tag information, and
the application program causes said second hardware processor to perform the operation depending on the screen displayed at said information processing device based on said processing information in said tag information.

5. The information processing system according to claim 3, wherein
said first hardware processor writes information to run a first application program on said startup information and information to run the next application program on said processing information when multiple application programs are run at said portable terminal one after another based on the screen displayed on said display part.

6. The information processing system according to claim 2, wherein
multiple application programs that work in concert with said information processing device are stored in said program storage, and
said second hardware processor selects one of the multiple application programs depending on the screen displayed at said information processing device based on said tag information, and runs the selected application program.

7. The information processing system according to claim 1, wherein
said second hardware processor generates information that should be sent to said information processing device depending on the screen displayed at said information processing device, and controls to send the generated information to said information processing device.

8. The information processing system according to claim 7, wherein
said second hardware processor controls to send said information to said information processing device via said second wireless communication part for sending said information to said information processing device.

9. The information processing system according to claim 7, wherein
said portable terminal further includes a network communication part that communicates with said information processing device over a network, which is different from the wireless communication by said second wireless communication part, and
said second hardware processor controls to send said information to said information processing device via said network communication part for sending said information to said information processing device.

10. The information processing system according to claim 9, wherein
said tag information includes connection information for said network communication part to connect to said network, and
said second hardware processor causes said network communication part to connect to said network based on said connection information in said tag information.

11. The information processing system according to claim 1, wherein
said information processing device further includes a tag information managing storage that manages registration information with which said tag information and each corresponding screen displayed on said display part are associated in advance with each other and registered, and
said tag information managing storage reads said tag information corresponding to the screen registered as said registration information, and updates said tag information stored in said tag information storage every time the screen displayed on said display part is updated by said first hardware processor.

12. An information processing device communicating with a portable terminal, comprising:
a wireless communication part that establishes one-to-one wireless communication with said portable terminal when said portable terminal is placed within a predetermined range;
a display part on which a screen is displayed;
a manipulation part that receives a user operation;
a hardware processor that updates the screen displayed on said display part based on the user operation received by said manipulation part;
a tag information storage that stores therein tag information which is sent to said portable terminal when said wireless communication part establishes wireless communication with said portable terminal, wherein
said hardware processor updates said tag information depending on the updated screen every time the screen displayed on said display part is updated based on the user operation received by the manipulation part.

13. The information processing device according to claim 12, wherein
said tag information includes startup information to run an application program at said portable terminal and processing information which defines a processing which should be performed at said portable terminal after the application program is run at said portable terminal, and
said hardware processor updates at least said processing information or said startup information and said processing information depending on the screen displayed on said display part.

14. The information processing device according to claim 13, wherein
said hardware processor writes information to run a first application program on said startup information and information to run the next application program on said processing information when multiple application programs are run at said portable terminal one after another based on the screen displayed on said display part.

15. The information processing device according to claim 14, wherein the first application program performs an operation relating to scan, and the next application program performs an operations relating to Optical Character Recognition (OCR).

16. The information processing device according to claim 13, wherein the application program performs operations relating to an authentication to authenticate a user.

17. The information processing device according to claim 13, wherein the application program performs operations relating to input and output of a file stored in a predetermined storage area.

18. The information processing device according to claim 13, wherein the application program performs operations relating to a voice input processing.

19. The information processing device according to claim 13, wherein the application program manages an address that includes an e-mail address.

20. The information processing device according to claim 12, further comprising:
   a tag information managing storage that manages registration information with which said tag information and each corresponding screen displayed on said display part are associated in advance with each other and registered,
   said tag information managing storage reads said tag information corresponding to the screen registered as said registration information, and updates said tag information stored in said tag information storage every time the screen displayed on said display part is updated by said hardware processor.

21. The information processing device according to claim 12, wherein
   said tag information includes startup information to run an application program at said portable terminal.

22. A portable terminal capable of communicating with an information processing device updating a screen based on a user operation, comprising:
   a program storage in which an application program to work in concert with said information processing device is stored;
   a wireless communication part that establishes one-to-one wireless communication with said information processing device when said information processing device is placed within a predetermined range; and
   a hardware processor that runs the application program based on tag information received from said information processing device when said wireless communication part establishes the wireless communication with said information processing device, and performs an operation depending on the screen displayed at said information processing device based on processing information included in said tag information after the application program is run.

23. The portable terminal according to claim 22, further including:
   a program storage in which an application program to work in concert with said information processing device is stored, and
   said hardware processor runs the application program based on said tag information, and performs the operation depending on the screen displayed at said information processing device with a function of the application program.

24. The portable terminal according to claim 23, wherein said tag information includes startup information to run the application program at said portable terminal and processing information which defines a processing which should be performed at said portable terminal after the application program is run at said portable terminal.

25. The portable terminal according to claim 24, wherein said hardware processor runs the application program based on said startup information in said tag information, and
   the application program causes said hardware processor to perform the operation depending on the screen displayed at said information processing device based on said processing information in said tag information.

26. The portable terminal according to claim 24, wherein multiple application programs that work in concert with said information processing device are stored in said program storage, and
   said hardware processor selects one of the multiple application programs depending on the screen displayed at said information processing device based on said tag information, and runs the selected application program.

27. The portable terminal according to claim 23, wherein the application program performs operations relating to an authentication to authenticate a user.

28. The portable terminal according to claim 23, wherein the application program performs operations relating to input and output of a file stored in a predetermined storage area.

29. The portable terminal according to claim 23, wherein the application program performs operations relating to a voice input processing.

30. The portable terminal according to claim 23, wherein the application program manages an address that includes an e-mail address.

31. The portable terminal according to claim 22, wherein said hardware processor generates information that should be sent to said information processing device depending on the screen displayed at said information processing device, and controls to send the generated information to said information processing device.

32. The portable terminal according to claim 31, wherein said hardware processor controls to send said information to said information processing device via a wireless communication part for sending said information to said information processing device.

33. The portable terminal according to claim 31, further including:
   a network communication part that communicates with said information processing device over a network, which is different from the wireless communication by said wireless communication part, and
   said hardware processor controls to send said information to said information processing device via said network communication part for sending said information to said information processing device.

34. The portable terminal according to claim 33, wherein said tag information includes connection information for said network communication part to connect to said network, and
   said hardware processor causes said network communication part to connect to said network based on said connection information in said tag information.

35. A non-transitory computer readable recording medium storing a program to be executed by an information processing device communicating with a portable terminal, wherein
   said information processing device includes:

a wireless communication part that establishes one-to-one wireless communication with said portable terminal when said portable terminal is placed within a predetermined range;

a display part on which a screen is displayed;

a manipulation part that receives a user operation;

a screen controller that updates the screen displayed on said display part based on the user operation received by said manipulation part;

a tag information storage that stores therein tag information which is sent to said portable terminal when said wireless communication part establishes wireless communication with said portable terminal, and a tag information updating part that updates said tag information in said tag information storage, wherein execution of the program by said information processing device causes said tag information updating part to update said tag information in said tag information storage depending on the updated screen every time the screen displayed on said display part is updated based on the user operation received by the manipulation part.

36. The non-transitory computer readable recording medium according to claim 35, wherein said tag information includes startup information to run an application program at said portable terminal and processing information which defines a processing which should be performed at said portable terminal after the application program is run at said portable terminal, and said program updates at least said processing information or said startup information and said processing information depending on the screen displayed on said display part.

37. The non-transitory computer readable recording medium according to claim 36, wherein said program writes information to run a first application program on said startup information and information to run the next application program on said processing information when multiple application programs are run at said portable terminal one after another based on the screen displayed on said display part.

38. The non-transitory computer readable recording medium according to claim 35, wherein the image processing device includes a tag information managing storage that manages registration information with which said tag information and each corresponding screen displayed on said display part are associated in advance with each other and registered, and execution of the program by said information processing device causes said tag information managing storage to read said tag information corresponding to the screen registered as said registration information, and to update said tag information stored in said tag information storage every time the screen displayed on said display part is updated.

39. The non-transitory computer readable recording medium according to claim 35, wherein said tag information includes startup information to run an application program at said portable terminal.

40. A non-transitory computer readable recording medium storing an application program to be executed by a portable terminal capable of communicating with an information processing device updating a screen based on a user operation, wherein said portable terminal includes:

a wireless communication part that establishes one-to-one wireless communication with said information processing device when said information processing device is placed within a predetermined range; and a hardware processor that runs the application program based on tag information received from said information processing device when said wireless communication part establishes wireless communication with said information processing device, and the application program causes said hardware processor to perform an operation depending on the screen displayed at said information processing device based on processing information included in said tag information after the application program is run by said hardware processor.

41. The non-transitory computer readable recording medium according to claim 40, wherein said portable terminal further includes a program storage in which an application program to work in concert with said information processing device is stored, and execution of the program by said portable terminal causes the hardware processor to run the application program based on said tag information, and to perform the operation depending on the screen displayed at said information processing device with a function of the application program.

42. The non-transitory computer readable recording medium according to claim 41, wherein said tag information includes startup information to run the application program at said portable terminal and processing information which defines a processing which should be performed at said portable terminal after the application program is run at said portable terminal, and execution of the program by said portable terminal causes the hardware processor to update at least said processing information of said startup information and said processing information depending on the screen displayed on said display part.

43. The non-transitory computer readable recording medium according to claim 42, wherein execution of the program by said portable terminal causes the hardware processor to run the application program based on said startup information in said tag information, and the application program causes said hardware processor to perform the operation depending on the screen displayed at said information processing device based on said processing information in said tag information.

44. The non-transitory computer readable recording medium according to claim 41, wherein multiple application programs that work in concert with said information processing device are stored in said program storage, and execution of the program by said portable terminal causes the hardware processor to select one of the multiple application programs depending on the screen displayed at said information processing device based on said tag information, and to run the selected application program.

45. The non-transitory computer readable recording medium according to claim 40, wherein execution of the program by said portable terminal causes the hardware processor to generate information that should be sent to said information processing device depending on the screen displayed at said information processing device, and to send the generated information to said information processing device.

46. The non-transitory computer readable recording medium according to claim 45, wherein
- execution of the program by said portable terminal causes the hardware processor to send said information to said information processing device via a wireless communication part for sending said information to said information processing device.

47. The non-transitory computer readable recording medium according to claim 45, wherein
- said portable terminal further includes a network communication part that communicates with said information processing device over a network, which is different from wireless communication by a wireless communication part, and
- execution of the program by said portable terminal causes the hardware processor to send said information to said information processing device via said network communication part for sending said information to said information processing device.

48. The non-transitory computer readable recording medium according to claim 47, wherein
- said tag information includes connection information for said network communication part to connect to said network, and
- execution of the program by said portable terminal causes said network communication part to connect to said network based on said connection information in said tag information.

* * * * *